(12) United States Patent
Inoue et al.

(10) Patent No.: US 7,893,707 B2
(45) Date of Patent: Feb. 22, 2011

(54) PHYSICAL PROPERTY MEASURING METHOD FOR TFT LIQUID CRYSTAL PANEL AND PHYSICAL PROPERTY MEASURING APPARATUS FOR TFT LIQUID CRYSTAL PANEL

(75) Inventors: Masaru Inoue, Tokyo (JP); Kunihiko Sasaki, Tokyo (JP); Takashi Kurihara, Yokohama (JP); Yasuhiro Kume, Kawachinagano (JP)

(73) Assignees: Toyo Corporation, Tokyo (JP); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/498,844

(22) Filed: Jul. 7, 2009

(65) Prior Publication Data

US 2009/0267614 A1    Oct. 29, 2009

Related U.S. Application Data

(63) Continuation of application No. PCT/JP2008/050449, filed on Jan. 16, 2008.

(30) Foreign Application Priority Data

Jan. 25, 2007    (JP)    ............................. 2007-015223

(51) Int. Cl.
*G01R 31/00*    (2006.01)

(52) U.S. Cl. .................................................... 324/770
(58) Field of Classification Search .................. None
See application file for complete search history.

(56) References Cited

U.S. PATENT DOCUMENTS 5,844,538 A * 12/1998 Shiraki et al. ................ 345/98

FOREIGN PATENT DOCUMENTS

| JP | 6-82835 A | 3/1994 |
|---|---|---|
| JP | 2001-264805 A | 9/2001 |

* cited by examiner

*Primary Examiner*—Minh N Tang
(74) *Attorney, Agent, or Firm*—Baker & Hostetler LLP

(57) ABSTRACT

There is provided a physical property measuring method for a TFT liquid crystal panel, includes an impedance setting step of setting the impedance between the source and drain of a TFT of the TFT liquid crystal panel to be less than or equal to a predetermined value, a voltage application step of applying a voltage that cyclically varies to a liquid crystal layer of the TFT liquid crystal panel. And the method further includes a physical property measuring step of measuring a transient current flowing through the liquid crystal layer to which the voltage that cyclically varies is applied in the voltage application step to measure physical properties of the liquid crystal layer.

7 Claims, 16 Drawing Sheets

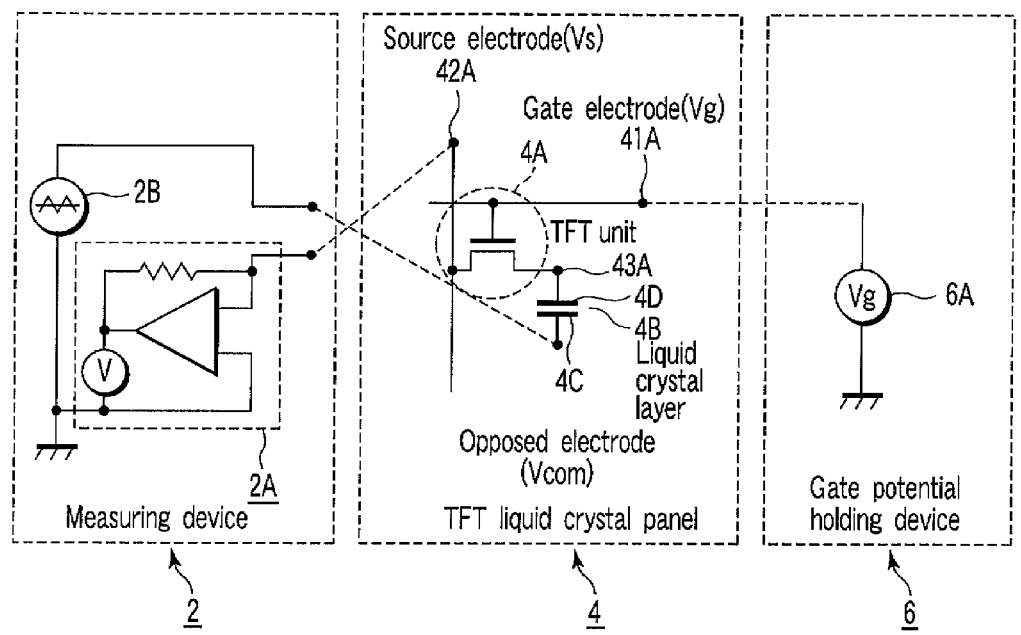
F I G. 1A
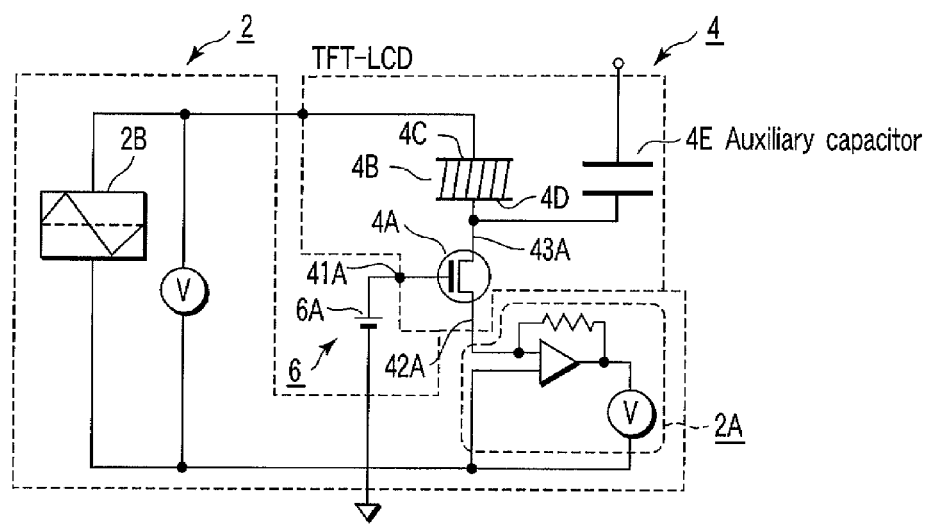
F I G. 1B

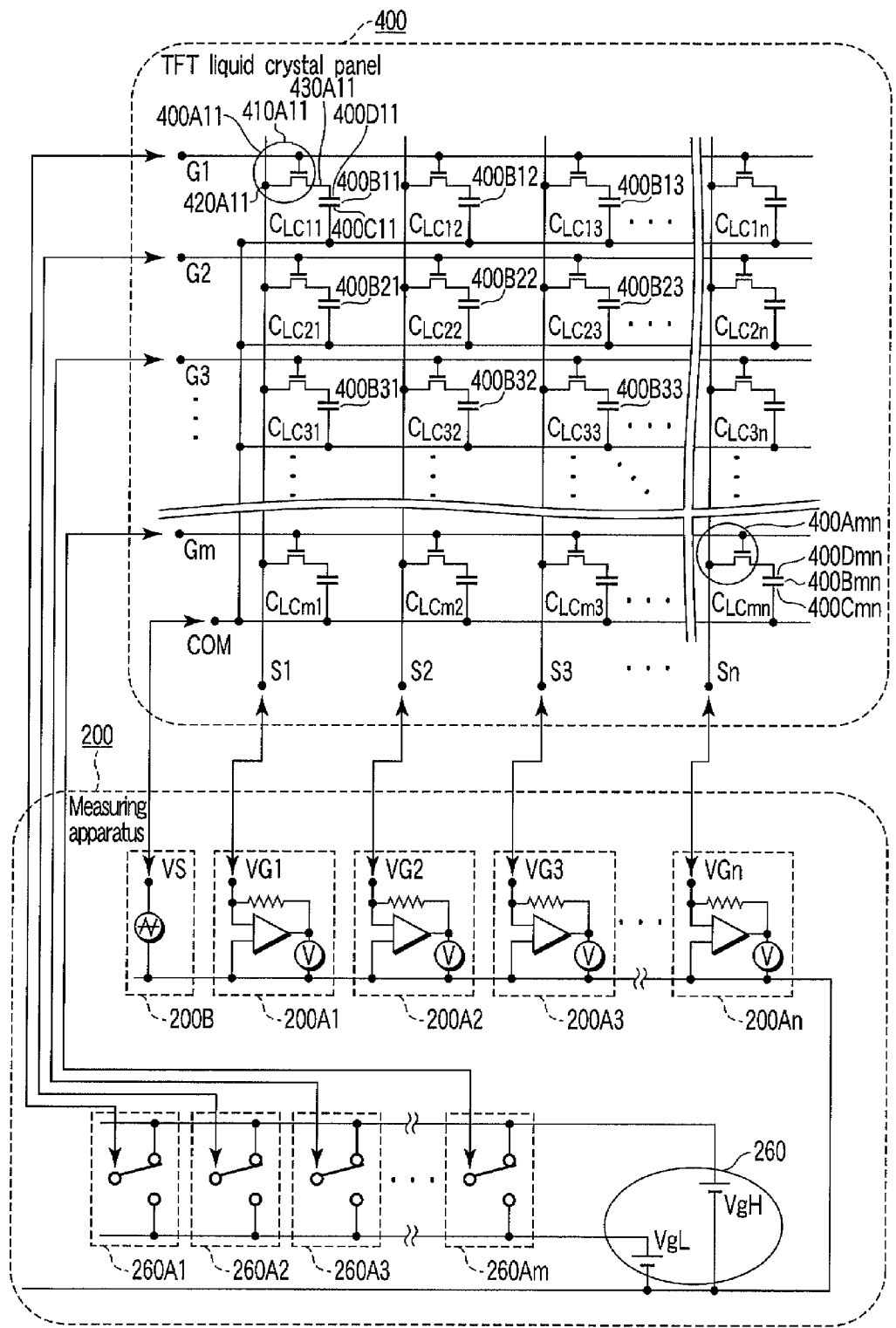
F I G. 14A

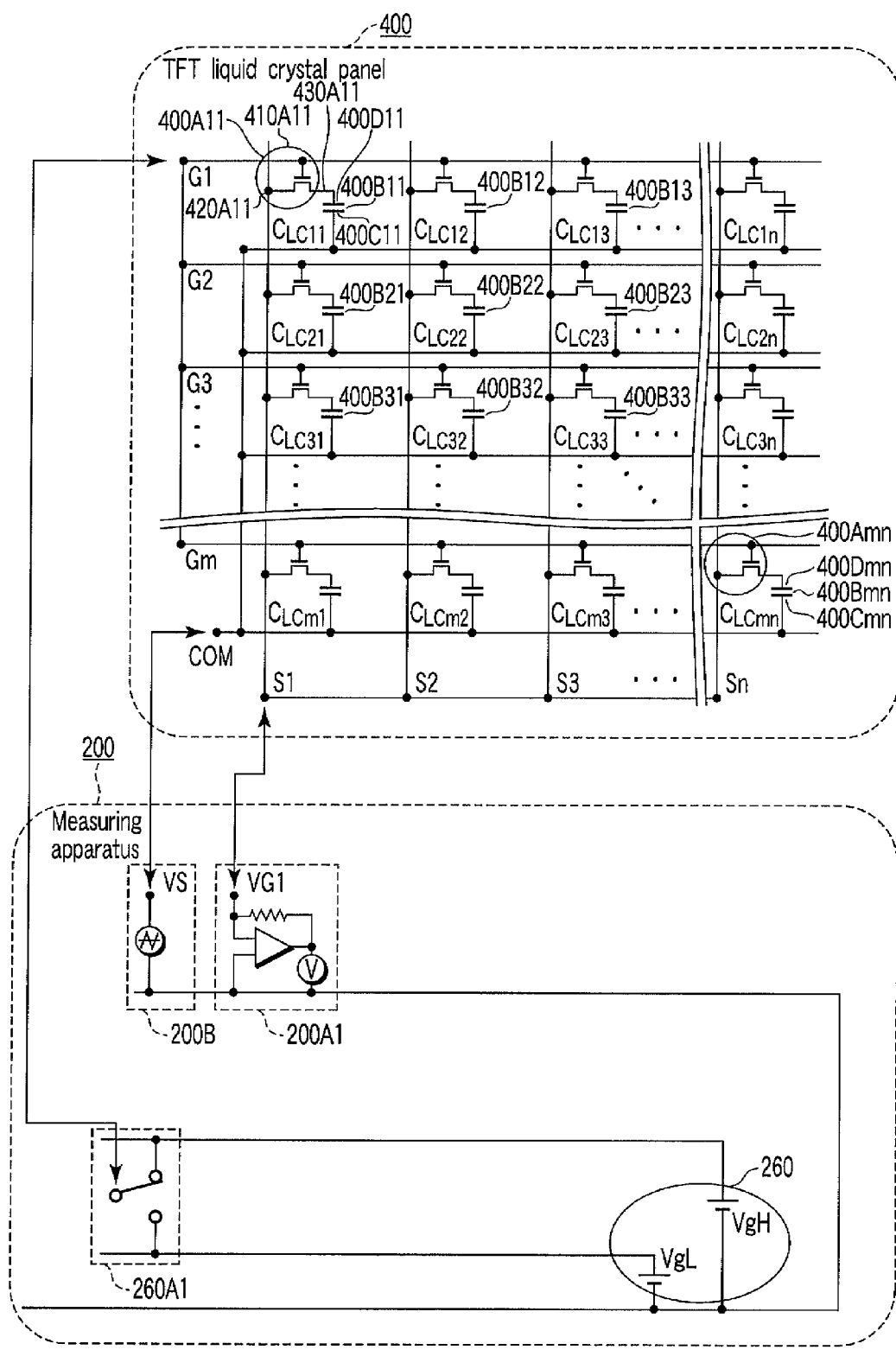
F I G. 14B

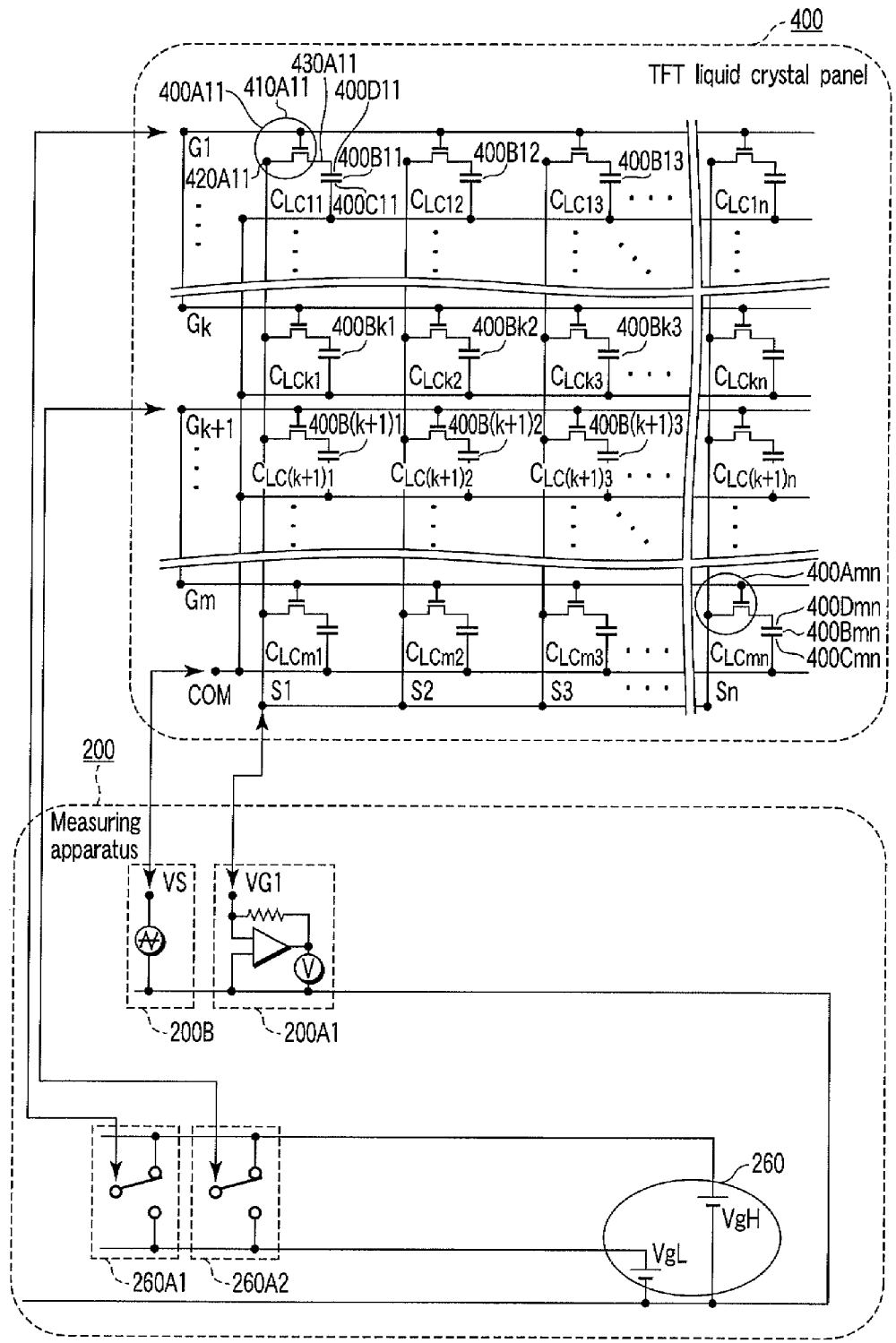
F I G. 14D

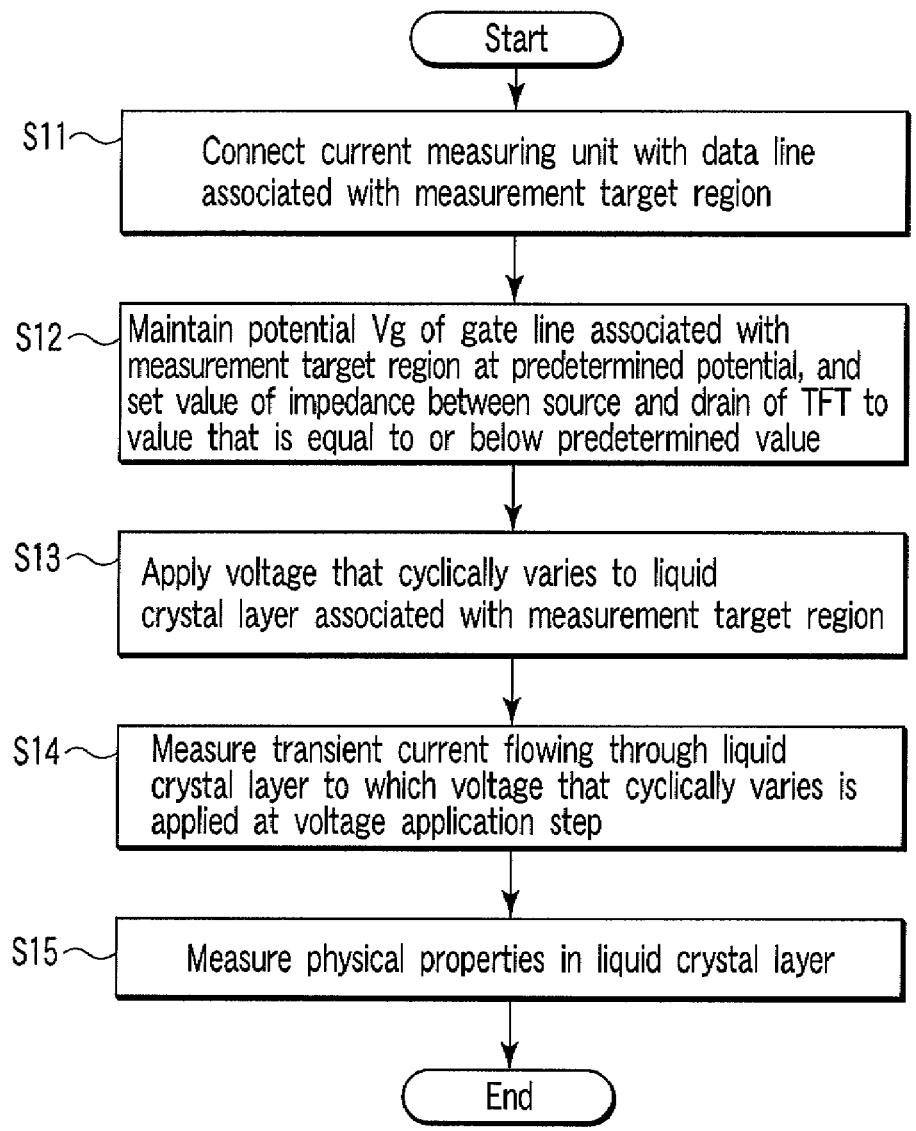
F I G. 15

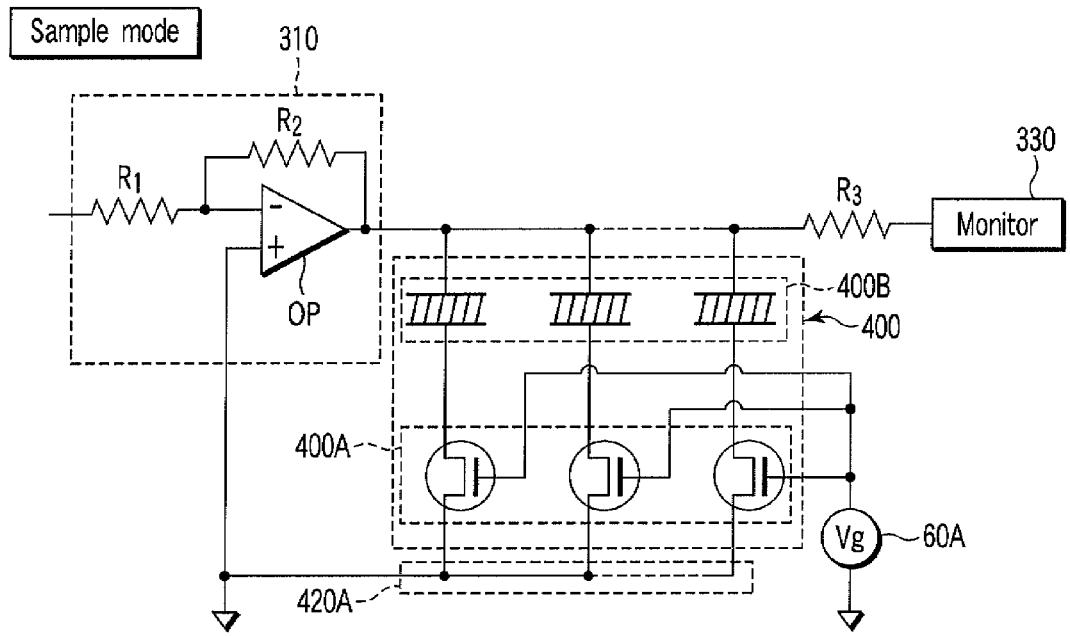
F I G. 16A
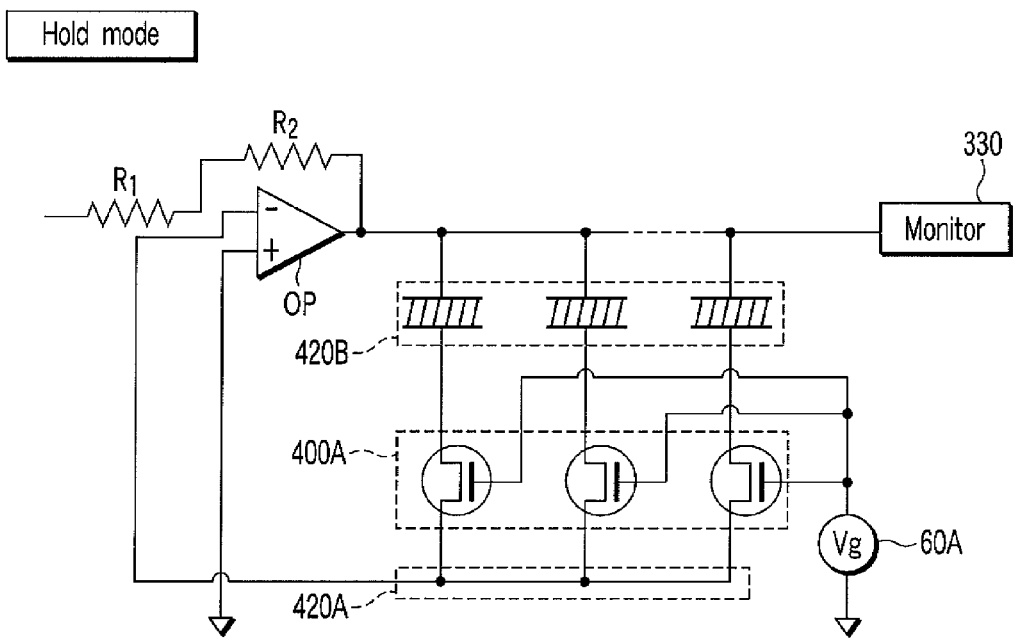
F I G. 16B

PHYSICAL PROPERTY MEASURING METHOD FOR TFT LIQUID CRYSTAL PANEL AND PHYSICAL PROPERTY MEASURING APPARATUS FOR TFT LIQUID CRYSTAL PANEL

CROSS-REFERENCE TO RELATED APPLICATIONS

This application is a Continuation of International patent application PCT/JP2008/050449, filed on Jan. 16, 2008, which claims priority to foreign application JP 2007-015223, filed on Jan. 25, 2007, the disclosures of which are incorporated herein by reference in their entirety.

BACKGROUND OF THE INVENTION

1. Field of the Invention

The present invention relates to a physical property measuring method for a thin-film transistor liquid crystal panel, and a physical property measuring apparatus for a thin-film transistor liquid crystal panel.

2. Description of the Related Art

In regard to a thin-film transistor (TFT) liquid crystal panel, measuring various physical properties of a liquid crystal layer of the TFT liquid crystal panel has heretofore been difficult because of its circuit configuration. Therefore, ion density measurement for ions as impurities included in a liquid crystal layer or measurement of various physical properties such as a voltage holding ratio is usually substituted by material evaluation using a test liquid crystal cell having no TFT which is manufactured separately from an actual product (a TFT liquid crystal panel) having a TFT.

However, measurements of various physical properties of the test liquid crystal cell are of course different from various physical properties of the TFT liquid crystal panel that is the actual product. Further, an additional cost to fabricate the test liquid crystal cell separately from the actual product is required. Furthermore, since the various physical properties of the actual product cannot be measured, various physical properties of a defective product that can be produced among the actual products cannot be of course measured.

Under such circumstances, for example, JP-A 2001-264805 (KOKAI) discloses the following technology as a technology that is used to measure a voltage holding ratio of a TFT liquid crystal panel.

That is, according to the technology disclosed in JP-A 2001-264805, a change in transmitted light intensity of a liquid crystal panel with time is measured at the time of driving a TFT, a voltage-transmittance characteristic curve is used to covert the measured transmitted light intensity into a voltage, and an attenuation value of the voltage involved by the change in transmitted light intensity with time is acquired, thereby obtaining a voltage holding ratio of the TFT liquid crystal panel.

However, since a voltage holding ratio measuring method for a TFT liquid crystal panel disclosed in JP-A 2001-264805 is a measuring method using an optical technique, its accuracy is of course inferior to that of a measuring method using an electrical technique.

Meanwhile, in a TFT liquid crystal panel, a defective region which is called an inlet port stain among persons skilled in the art is irregularly produced near a liquid crystal inlet port of the TFT liquid crystal panel in a manufacturing process thereof. Therefore, a technology that enables measuring physical properties of a liquid crystal layer alone in a desired region (pixel) of the TFT liquid crystal panel is demanded. According to such a technology, not only the inlet port stain generating region but also a region concerning, e.g., a failure of the TFT liquid crystal panel can be found.

However, the technology that enables measuring physical properties of the liquid crystal layer in a desired region (pixel) of the TFT liquid crystal panel is not suggested, and the technology disclosed in JP-A 2001-264805 is not of course such a technology.

BRIEF SUMMARY OF THE INVENTION

In view of the above-described problems, it is an object of the present invention to provide a physical property measuring method for a TFT liquid crystal panel that enables accurate measurement of various physical properties of a liquid crystal layer of the TFT liquid crystal panel that can be used as an actual product in accordance with each desired region (pixel) by using an electrical technique.

According to an aspect of a physical property measuring method for a TFT liquid crystal panel of the present invention, there is provided a physical property measuring method for a TFT liquid crystal panel, comprising: an impedance setting step of setting the impedance between the source and drain of a TFT of the TFT liquid crystal panel to be less than or equal to a predetermined value; a voltage application step of applying a voltage that cyclically varies to a liquid crystal layer of the TFT liquid crystal panel; and a physical property measuring step of measuring a transient current flowing through the liquid crystal layer to which the voltage that cyclically varies is applied in the voltage application step to measure physical properties of the liquid crystal layer.

Further, according to an aspect of a physical property measuring method for a TFT liquid crystal panel of the present invention, there is provided a physical property measuring method for a TFT liquid crystal panel, comprising: a step of applying a voltage having a predetermined value to a gate electrode of a TFT in the liquid crystal panel; a step of writing a pulse voltage in a liquid crystal layer of the TFT liquid crystal panel; and a step of detecting a change in potential in the liquid crystal layer having the pulse voltage written therein to measure a voltage holding ratio in the liquid crystal layer.

Furthermore, according to an aspect of a physical property measuring method for a TFT liquid crystal panel of the present invention, there is provided a physical property measuring method for a TFT liquid crystal panel, comprising: an impedance setting step of setting the impedance between the source and drain of a TFT of the TFT liquid crystal panel to be less than or equal to a predetermined value; a voltage application step of applying a voltage that cyclically varies to a liquid crystal layer of the TFT liquid crystal panel and an auxiliary capacitor that is electrically connected with the liquid crystal layer in parallel; and a physical property measuring step of measuring a combined current of a transient current flowing through the liquid crystal layer and a transient current flowing through the auxiliary capacitor to which the voltage that cyclically varies is applied in the voltage application step to measure physical properties as a combination of characteristics of the liquid crystal layer and characteristics of the auxiliary capacitor.

Moreover, according to an aspect of a physical property measuring method for a TFT liquid crystal panel of the present invention, there is provided a physical property measuring method for a TFT liquid crystal panel, comprising: a step of applying a voltage having a predetermined value to a gate electrode of a TFT of the TFT liquid crystal panel; a step of writing a pulse voltage in a liquid crystal layer of the TFT liquid crystal panel and an auxiliary capacitor electrically connected with the liquid crystal layer in parallel; and a step of detecting a change in combined potential of the liquid crystal layer and the auxiliary capacitor having the pulse voltage written therein to measure a combined voltage holding ratio in the liquid crystal layer and the auxiliary capacitor.

Additionally, according to an aspect of a physical property measuring apparatus for a TFT liquid crystal panel of the present invention, there is provided a physical property measuring apparatus for a TFT liquid crystal panel, comprising: a triangular wave generating unit that applies a triangular wave voltage to a liquid crystal layer of the TFT liquid crystal panel; a measuring unit that measures a transient current flowing through the liquid crystal layer to which the triangular wave voltage is applied by the triangular wave generating unit; and a gate potential holding unit that applies a voltage having a predetermined value to a gate electrode of a TFT of the TFT liquid crystal panel.

Further, according to an aspect of a physical property measuring apparatus for a TFT liquid crystal panel of the present invention, there is provided a physical property measuring apparatus for a TFT liquid crystal panel, comprising: a pulse voltage application circuit that writes a pulse voltage in a liquid crystal layer of the TFT liquid crystal panel; a potential change detection circuit that detects a change in potential in the liquid crystal layer to which the pulse voltage is applied by the pulse voltage application circuit to measure a voltage holding ratio in the liquid crystal layer; and a gate potential holding unit that applies a voltage having a predetermined value to a gate electrode of a TFT of the TFT liquid crystal panel.

Furthermore, according to an aspect of a physical property measuring method for a TFT liquid crystal panel of the present invention, there is provided a physical property measuring method for a liquid crystal layer in a TFT liquid crystal panel, comprising: a setting step of connecting a current measuring unit to a data line associated with a TFT in a physical property measurement target region of the TFT liquid crystal panel and maintaining a potential of a gate line associated with the TFT in the physical property measurement target region at a predetermined potential; a voltage application step of applying a voltage that cyclically varies to the liquid crystal layer in the physical property measurement target region; and a physical property measuring step of measuring a transient current flowing through the liquid crystal layer to which the voltage that cyclically varies is applied in the voltage application step to measure physical properties of the liquid crystal layer.

Moreover, according to an aspect of a physical property measuring apparatus for a TFT liquid crystal panel of the present invention, there is provided a physical property measuring apparatus for a liquid crystal layer in a TFT liquid crystal panel, comprising: a constant voltage source that applies a voltage having a predetermined value to a gate of a TFT in a physical property measurement target region of the TFT liquid crystal panel; a voltage application unit that writes a pulse voltage in the liquid crystal layer of the TFT liquid crystal panel in the physical property measurement target region; a measuring unit that detects a change in potential in the liquid crystal layer having the pulse voltage written therein to measure a voltage holding ratio in the liquid crystal layer; and a feedback unit that feeds back an output from a source of the TFT in the physical property measurement target region to the voltage application unit when measuring the voltage holding ratio by the measuring apparatus.

Additionally, according to an aspect of a physical property measuring apparatus for a TFT liquid crystal panel of the present invention, there is provided a physical property measuring apparatus for a TFT liquid crystal panel, comprising: a gate potential holding unit that maintains a potential of a gate line associated with a TFT in a physical property measurement target region of the TFT liquid crystal panel to a predetermined potential; a triangular wave generating unit that applies a triangular wave voltage to a liquid crystal layer of the TFT liquid crystal panel; and a current measuring unit that is connected with a data line associated with the TFT in the physical property measurement target region and measures a transient current flowing through the liquid crystal layer to which the triangular wave voltage is applied by the triangular wave generating unit.

BRIEF DESCRIPTION OF THE DRAWINGS

FIG. 1A is a view schematically showing an apparatus structure that realizes a physical property measuring method for a TFT liquid crystal panel according to a first embodiment of the present invention;

FIG. 1B is a view showing an equivalent circuit of the apparatus depicted in FIG. 1A;

FIG. 14A is a view showing an example of an apparatus structure that realizes a physical property measuring method for a TFT liquid crystal panel according to a second embodiment;

FIG. 14B is a view showing an example of the apparatus structure that realizes the physical property measuring method for a TFT liquid crystal panel according to the second embodiment;

FIG. 14D is a view showing an example of the apparatus structure that realizes the physical property measuring method for a TFT liquid crystal panel according to the second embodiment;

FIG. 15 is a view showing a flowchart of the physical property measuring method for a TFT liquid crystal panel according to the second embodiment;

FIG. 16A is a view showing a circuit utilized to write a pulse voltage in the liquid crystal layer;

FIG. 16B is a view showing a circuit utilized to detect a change in potential in the liquid crystal layer.

DETAILED DESCRIPTION OF THE INVENTION

Figure 2:
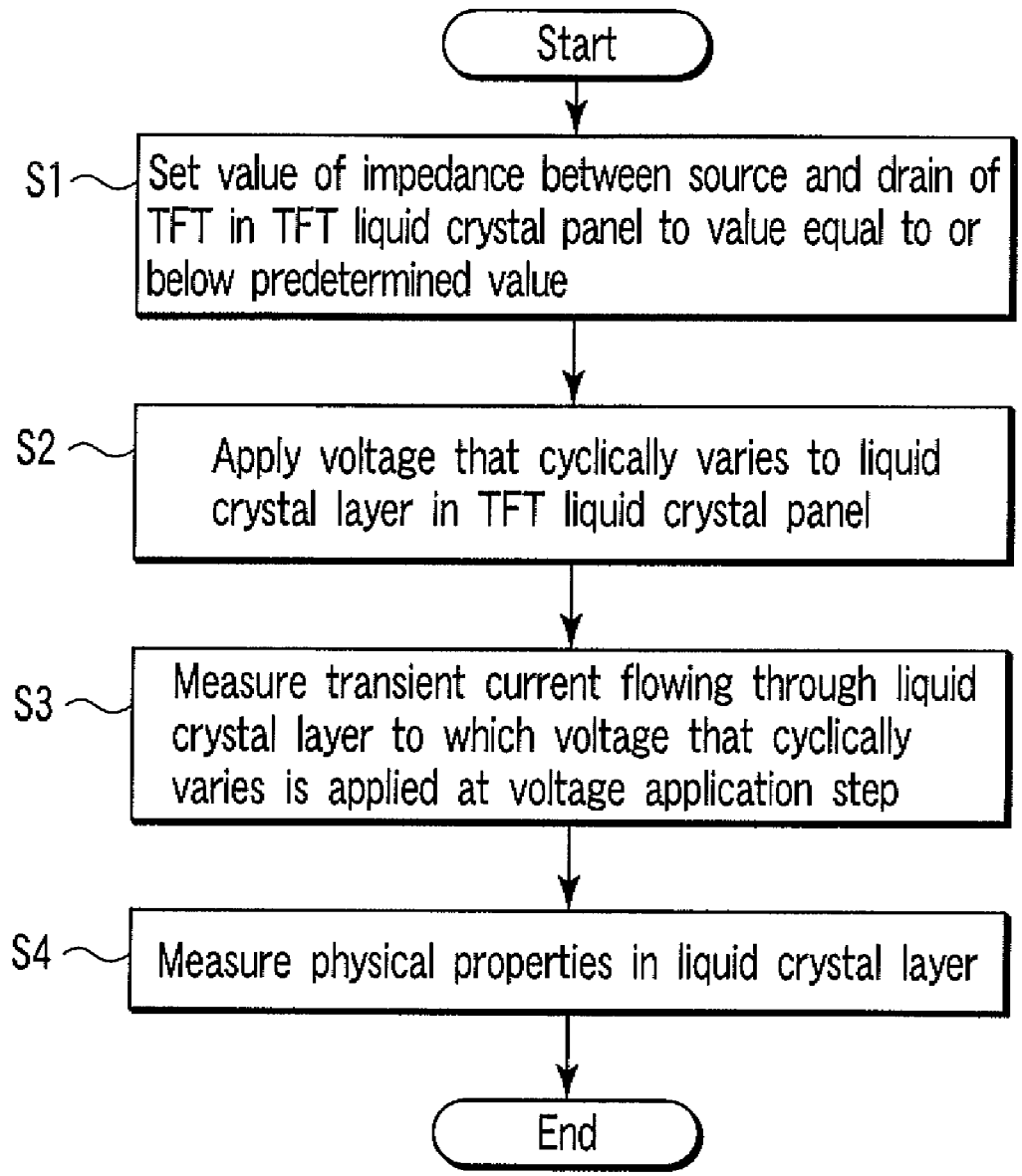
FIG. 2 is a view showing a flowchart of the physical property measuring method for a TFT liquid crystal panel according to the first embodiment.

The best mode for carrying out the present invention will now be described hereinafter with reference to the drawings.

First Embodiment

A first embodiment according to the present invention will now be described hereinafter with reference to the drawings.

FIG. 1A is a view schematically showing a structural example of a physical property measuring apparatus structure for a TFT liquid crystal panel according to this first embodiment. That is, the physical property measuring apparatus for a TFT liquid crystal panel according to this first embodiment includes a measuring device 2, a TFT liquid crystal panel 4, and a gate potential holding device 6 as shown in FIG. 1A.

The measuring device 2 has a current measuring unit 2A including an I/V amplifier and a triangular generator 2B. The TFT liquid crystal panel 4 has a TFT 4A, a liquid crystal layer 4B, an opposed electrode 4C, a pixel electrode 4D, an auxiliary capacitor 4E (which is not shown in FIG. 1A, see an equivalent circuit depicted in FIG. 1B). Here, the TFT 4A includes a gate electrode 41A, a source electrode 42A, and a drain electrode 43A.

Here, the gate potential holding device 6 has a constant voltage source 6A that is used to maintain a potential Vg of the gate electrode 41A of the TFT 4A at a predetermined potential. Further, the source electrode 42A of the TFT 4A is virtually grounded by the current measuring unit 2A as depicted in the drawing. As a result, the source electrode 42A of the TFT 4A is substantially maintained at ground potential.

Meanwhile, an image signal on a predetermined level written in the liquid crystal layer 4B through the pixel electrode 4D is maintained for a fixed period. Here, for the purpose of preventing the maintained image signal from leaking, the auxiliary capacitor 4E is provided in parallel with the liquid crystal layer 4B.

That is, the auxiliary capacitor 4E improves charge holding characteristics in the liquid crystal layer 4B, and a display device in which display unevenness hardly occurs is realized.

Further, according to the first embodiment, although particulars will be described later, the resistance and capacitance of the auxiliary capacitor 4E can be obtained.

Meanwhile, an equivalent circuit of the apparatus depicted in FIG. 1A is as shown in FIG. 1B. Moreover, FIG. 2 is a view showing a flowchart of a physical property measuring method for a TFT liquid crystal panel according to the first embodiment. The physical property measuring method for a TFT liquid crystal panel according to the first embodiment will now be described with reference to FIGS. 1B and 2.

First, a potential Vg of the gate electrode 41A at the TFT 4A is maintained at a predetermined potential by the constant voltage source 6A (step S1). Here, the predetermined potential is a potential that can reduce an impedance of the TFT 4A to have a small value that enables a current flowing through the liquid crystal layer 4B to be measured. In other words, the predetermined potential means a potential that can set the impedance between the source electrode 42A and drain electrode 43A of the TFT to a value that enables a current to flow between the source electrode 42A and drain electrode 43A of the TFT (a detailed numerical value will be described later).

That is, when Vg of the gate electrode 41A of the TFT 4A is maintained at the predetermined potential, various physical properties of the liquid crystal layer 4B of the TFT liquid crystal panel 4 can be more accurately measured by an electrical technique (particulars will be described later).

It is to be noted that Vg of the gate electrode 41A is maintained at the predetermined potential, but Vg of the gate electrode 41A does not have to be necessarily maintained at a fixed potential as long as it is a potential that can set a value of the impedance of the TFT 4A to a value that enables the flow of a current between the source electrode 42A and the drain electrode 43A of the TFT.

That is, Vg of the gate electrode 41A may be a potential that varies with time as long as it is a potential that can set a value of the impedance of the TFT 4A to a value that enables the flow of a current between the source electrode 42A and the drain electrode 43A of the TFT.

Figure 3:
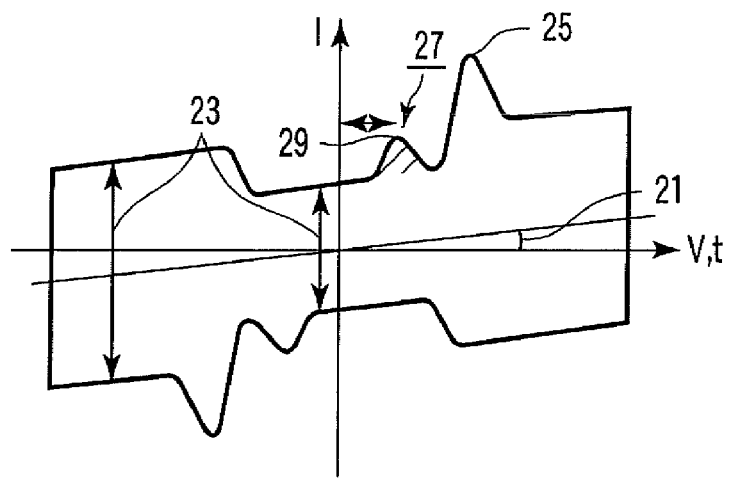
FIG. 3 is a view showing a graph of a voltage (time)-current plot obtained by measuring a transient current that flows when a triangular wave is applied to a liquid crystal layer.

Meanwhile, a triangular wave generated by the triangular wave generator 2B is applied to the TFT liquid crystal panel 4 after the processing in step S1 (step S2). Further, a transient current flowing through the liquid crystal layer 4B is measured (step S3). FIG. 3 shows a graph of a voltage V (time t) current I plot obtained from measurement of the transient current in this step S3.

A relationship between a graph of the voltage V (time t)-current I plot and later-explained various physical properties will now be described with reference to FIG. 3.

First, as the various physical properties, the following are the five main ones:

1: Resistance of the liquid crystal layer 4B
2: Capacitance of the liquid crystal layer 4B
3: Switching voltage of the liquid crystal layer 4B
4: Ion density of the liquid crystal layer 4B
5: Ion mobility of the liquid crystal layer 4B Further, the relationship between the graph of the voltage V (time t)-current I plot and the various physical properties is as follows.

First, an inclination 21 with respect to a V axis (a t axis) is indicative of a resistance value of the liquid crystal layer 4B. Furthermore, a width 23 of a graph having a substantial parallelogram depicted in FIG. 3 along an I axis direction is indicative of the capacitance of the liquid crystal layer 4B. Moreover, a voltage of a peak 25 of the graph having the substantial parallelogram along the I axis direction is indicative of a switching voltage of the liquid crystal layer 4B. Additionally, an area of the substantial parallelogram in a protruding portion 27 is indicative of an ion density of the liquid crystal layer 4B. Further, an ion mobility μ of the liquid crystal layer 4B can be calculated from the following expression.

$$\mu = \frac{d^2}{1/2 \cdot t \cdot V} (\text{cm}^2/V \cdot \text{sec}) \quad \text{Expression 1}$$

Here, d is a thickness (cm) of the liquid crystal layer 4B, t is a time (s) at the apex 29 of the protruding portion 27, and V is a voltage value (V) at the apex 29 of the protruding portion 27.

Based on the above-described method, the various physical properties of the liquid crystal layer 4B, i.e., the resistance of the liquid crystal layer 4B, capacitance of the liquid crystal layer 4B, switching voltage of the liquid crystal layer 4B, ion density of the liquid crystal layer 4B, and ion mobility of the liquid crystal layer 4B, are obtained from the graph of the voltage V (time t)-current I plot acquired by measuring a transient current which flows when a triangular wave is applied to the liquid crystal layer 4B (step S4).

Figure 4A:
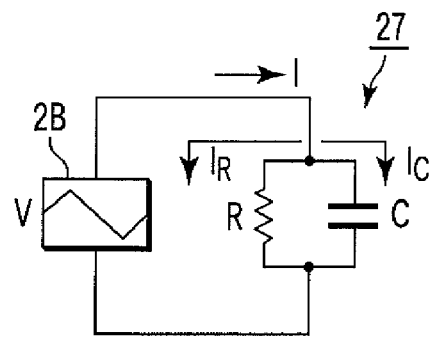
FIG. 4A is a view showing an equivalent circuit in which a liquid crystal layer is substituted by a resistor and a capacitor.
Figure 4B:
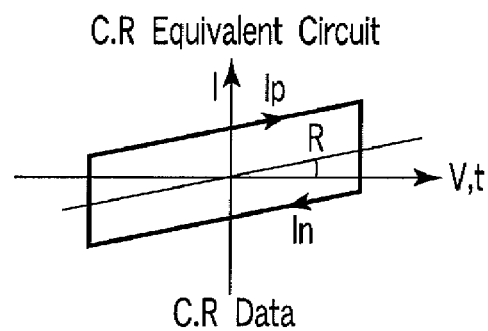
FIG. 4B is a view showing a graph of a voltage (time)-current plot obtained by measuring a transient current that flows when a triangular wave is applied to the liquid crystal layer.

FIG. 4A is a view showing a circuit that applies the triangular wave to the liquid crystal layer 4B (a resistor R and a capacitor C) when the liquid crystal layer 4B is substituted by the resistor R and the capacitor C. Furthermore, FIG. 4B is a view showing a graph of a voltage (time)-current plot obtained by measuring a transient current that flows when a triangular wave is applied to the liquid crystal layer 4B in the circuit depicted in FIG. 4A. Considerations will be given as to the graph of the voltage (time)-current plot obtained by measuring a transient current that flows when a triangular wave is applied to the liquid crystal layer 4B with reference to FIG. 4A and FIG. 4B.

It is to be noted that the circuit depicted in FIG. 4A is a circuit in which the liquid crystal layer 4B is simply substituted by the resistor R and the capacitor C, and hence a waveform of the graph shown in FIG. 4B is not such a shape as depicted in FIG. 3 but a simple parallelogram.

First, assuming that a current flowing through the circuit is I, a current flowing through the resistor R is IR, and a current flowing through the capacitor C is IC when a triangular wave is applied to the liquid crystal layer 4B by the triangular wave generator 2B, the current I is represented as follows:

$$I = I_C + I_R = C\frac{dV}{dt} + \frac{1}{R}V \quad \text{Expression 2}$$

Here, considering that a voltage applied to the liquid crystal layer 4B has a triangular wave, the current I is represented as follows:

$$I_p = C\frac{dV}{dt} + \frac{1}{R}V \quad \text{Expression 3}$$

where a current Ip is the current I when dV/dt>0.
On the other hand, a current In is represented as follows:

$$I_n = -C\frac{dV}{dt} + \frac{1}{R}V \quad \text{Expression 4}$$

where the current In is the current I when dV/dt<0.

Therefore, each of the current Ip and the current In is represented as a graph having such a shape as shown in FIG. 4B. Here, a difference between the current Ip and the current In is as follows:

$$\Delta I = I_p - I_n = 2C\frac{dV}{dt} \quad \text{Expression 5}$$

That is, it can be understood from (Expression 5) that a value of the capacitance C can be obtained from a width 23 of the substantial parallelogram in the I axis direction. Further, when (Expression 2) is differentiated by V, the following expression can be obtained, and it can be understood from the inclination 21 with respect to the V axis (a t axis) that a value of the resistance R can be obtained:

$$\frac{dI}{dV} = 0 + \frac{1}{R} \quad \text{Expression 6}$$

Figure 5:
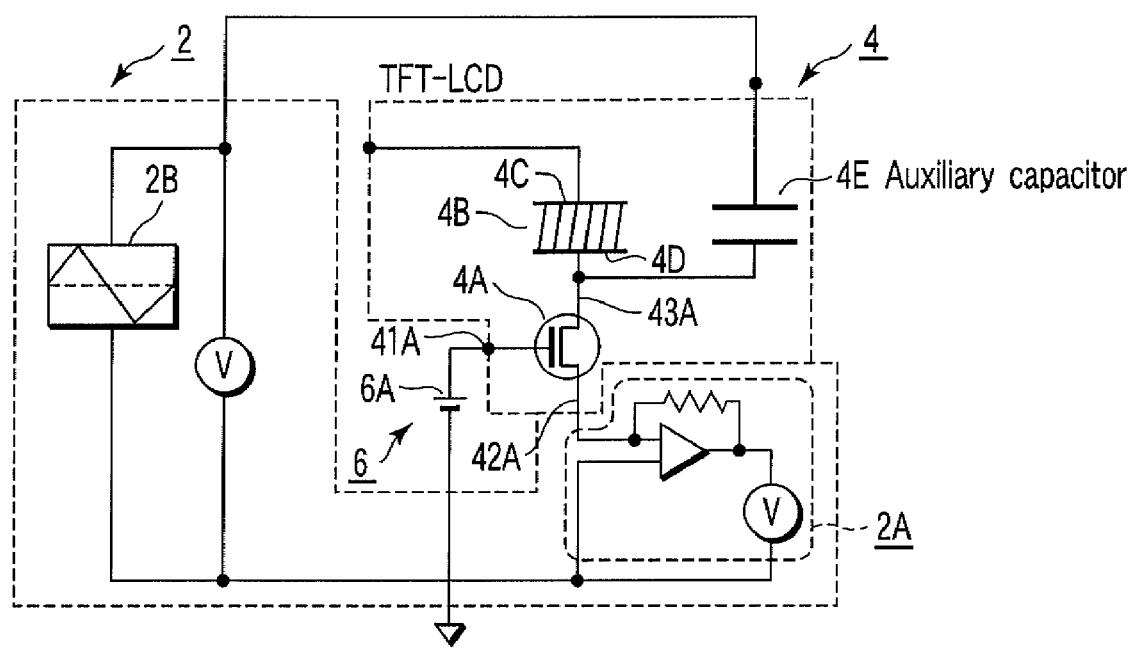
FIG. 5 is a view showing a structure of a measuring circuit when measuring various physical properties of an auxiliary capacitor.

Meanwhile, according to the first embodiment, not only physical properties of the liquid crystal layer 4B but also various physical properties of the auxiliary capacitor 4E can be obtained. Here, as physical properties of the auxiliary capacitor 4E, the following are the two main ones:

1: Resistance of the auxiliary capacitor 4E
2: Capacitance of the auxiliary capacitor 4E It is to be noted that, when measuring various physical properties of the auxiliary capacitor 4E, the circuit configuration for measurement is changed to a configuration depicted in FIG. 5 rather than the structure shown in FIG. 1B. That is, the triangular wave generator 2B is connected with the auxiliary capacitor 4E rather than the opposed electrode 4C. In other words, a circuit configuration that is used to apply a triangular wave to the auxiliary capacitor 4E is adopted.

It is to be noted that the auxiliary capacitor 4E does not have the liquid crystal layer, and hence it can be simply substituted by the resistor R and the capacitor C. Therefore, the circuit depicted in FIG. 4A can be regarded as a circuit that applies a triangular wave to the auxiliary capacitor 4E (the resistor R and the capacitor C) as it is. Furthermore, in the circuit depicted in FIG. 4A, a graph of a voltage (time)-current plot obtained by measuring a transient current which flows when a triangular wave is applied to the auxiliary capacitor 4E is the graph depicted in FIG. 4B itself.

An example of various conditions required to accurately measure the various physical properties of the liquid crystal layer 4B and the auxiliary capacitor 4E of the TFT liquid crystal panel 4 by an electrical technique will now be described. That is, for example, assuming that an amplitude of a triangular wave applied by the triangular wave generator 2B is 10 V and a frequency of the same is 0.01 Hz, the predetermined potential at which Vg of the gate electrode 41A should be maintained is +10 V.

It is to be noted that the measurement processing may be advanced in the order of steps S1, S2, S3 and S4, as described above, but the measurement processing does not have to be carried out in this order, and the measurement processing may be of course advanced in the order of, e.g., steps S2, S1, S3 and S4.

Figure 6A:
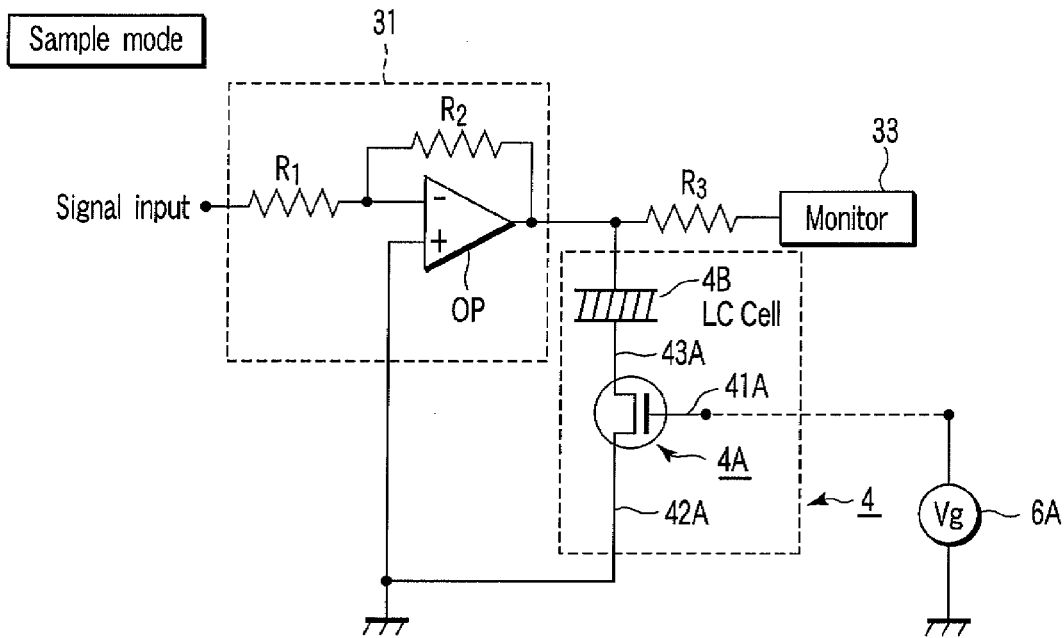
FIG. 6A is a view showing a circuit utilized to write a pulse voltage in the liquid crystal layer.
Figure 6B:
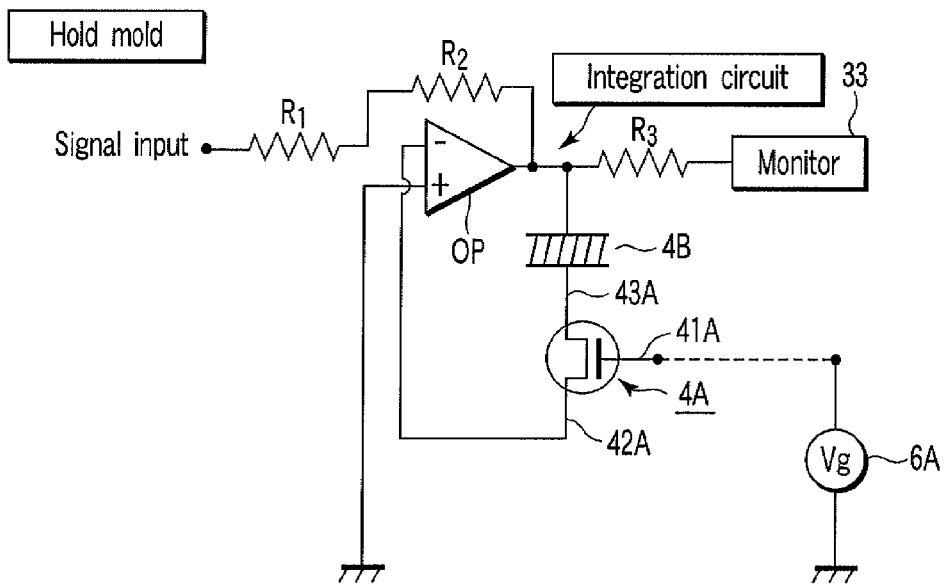
FIG. 6B is a view showing a circuit utilized to detect a change in potential in the liquid crystal layer.
Figure 7:
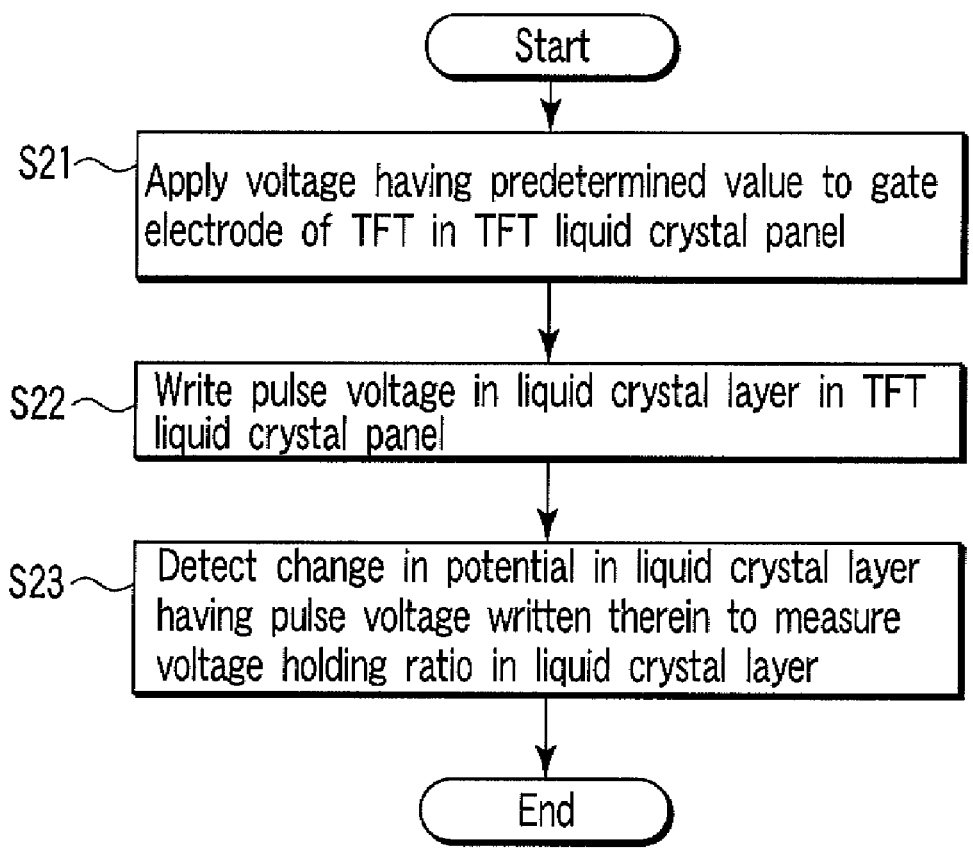
FIG. 7 is a view showing a flowchart of a voltage holding ratio measuring method for the liquid crystal layer in the first embodiment.

A method of obtaining a voltage holding ratio in the liquid crystal layer 4B will now be described. FIG. 6A shows a circuit that is used to write a pulse voltage in the liquid crystal layer 4B, and FIG. 6B shows a circuit that is used to detect a change in potential in the liquid crystal layer 4B. FIG. 7 is a view showing a flowchart of a voltage holding ratio measuring method in the liquid crystal layer 4B.

As shown in FIGS. 6A and 6B, to enable detecting a change in potential in the liquid crystal layer 4B by the monitor 33, Vg of the gate electrode 41A of the TFT 4A is constantly maintained at a predetermined potential by using the constant voltage source 6A (step S21).

This predetermined potential is a potential that can set an impedance of the TFT 4A to a small value enabling measuring a voltage applied to the liquid crystal layer 4B by the monitor 33.

In the circuit that is used to write a pulse voltage in the liquid crystal layer 4B, a voltage application unit 31 formed of a resistor R1, a resistor R2, and an operational amplifier OP is connected with the TFT liquid crystal panel 4 having the TFT 4A and the liquid crystal layer 4B as shown in FIG. 6A. That is, a pulse voltage is written in the liquid crystal layer 4B by the voltage application unit 31.

Further, the voltage application unit 31 is connected with a voltage source (not shown) that generates the pulse voltage, and receives a voltage signal fed from the voltage source (not shown). Further, the voltage application unit 31 and the TFT liquid crystal panel 4 are connected through a resistor R3 to the monitor 33 that is used to detect a change in potential in the liquid crystal layer 4B. Furthermore, the source electrode 42A of the TFT 4A is grounded.

Under such a circuit configuration, as shown in FIG. 6A, a pulse voltage whose value is determined based on a ratio of a value of the resistor R1 and a value of the resistor R2 in the voltage application unit 31 is applied to the liquid crystal layer 4B by using the voltage source (not shown), thereby writing the pulse voltage in the liquid crystal layer 4B (step S22).

Subsequently, as shown in FIG. 6B, an output from the source electrode 42A of the TFT 4A is input to the operational amplifier OP. In other words, an output from the source electrode 42A is negatively fed back to the operational amplifier OP.

At this time, in light of the structure where the liquid crystal layer 4B has a resistance component and a capacitance component, a portion formed of resistor R1, resistor R2, the liquid crystal layer 4B, and the operational amplifier OP can be regarded as a kind of integrator.

That is, according to the circuit depicted in FIG. 6B, when the resistance component or the capacitance component in the liquid crystal layer 4B changes, this change appears as a change in output voltage of the operational amplifier OP. Therefore, a voltage holding ratio of the liquid crystal layer 4B is measured by detecting this change by using the monitor 33 (step S23). This measuring method will now be described in detail hereinafter.

Figure 8:
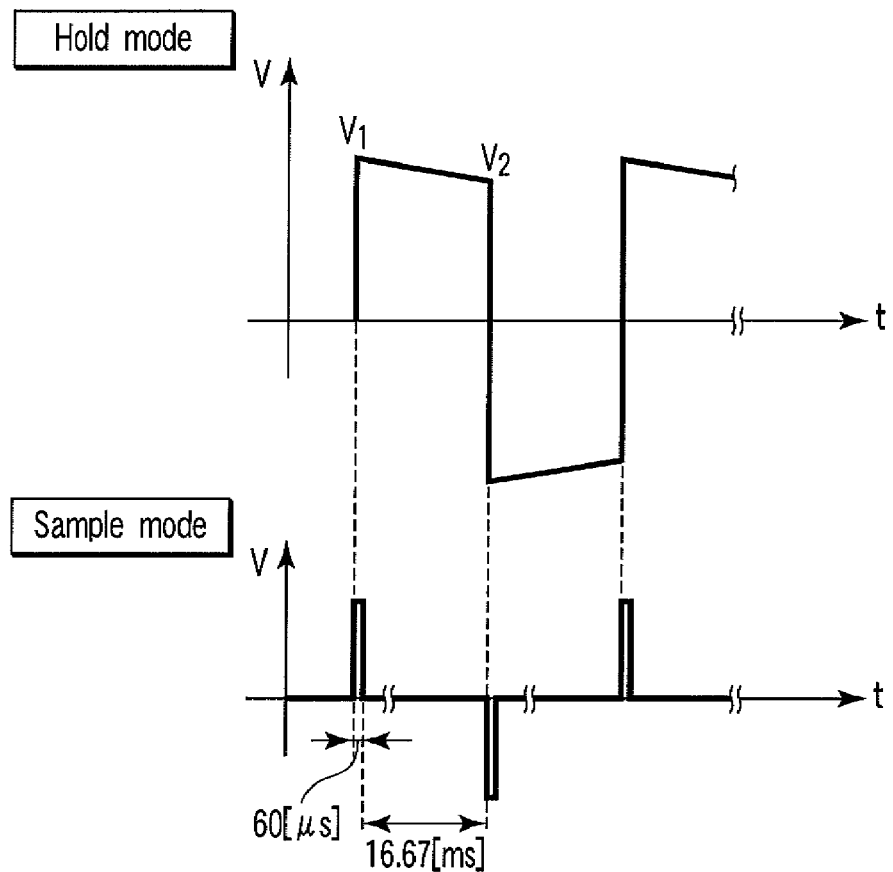
FIG. 8 is view showing a graph indicating a pulse voltage when writing a pulse voltage in the liquid crystal layer and a graph when a change in potential in the liquid crystal layer is detected.

FIG. 8 is a view showing a graph indicative of a pulse voltage when writing a pulse voltage in the liquid crystal layer 4B by using the circuit depicted in FIG. 6A (a graph in a sample mode) and a graph indicative of a change in potential in the liquid crystal layer 4B caused by the circuit depicted in FIG. 6B (a graph in a hold mode).

That is, as shown in the graph in the sample mode, a pulse voltage when writing the pulse voltage in the liquid crystal layer 4B is set to, e.g., a pulse voltage having a width of 60 µs at an interval of 16.67 ms. Moreover, when such a pulse voltage is applied, a potential in the liquid crystal layer 4B first becomes V1 and is then of course reduced. Here, a potential in the liquid crystal layer 4B just before the next pulse voltage is applied to the liquid crystal layer 4B is determined as V2.

Figure 9A:
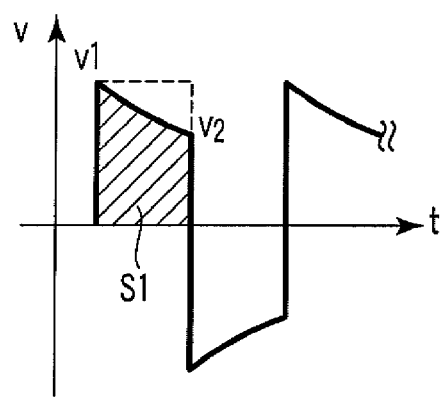
FIG. 9A is a graph showing areas to be calculated in the graphs depicted in FIG. 8 when obtaining a voltage holding ratio of the liquid crystal layer.
Figure 9B:
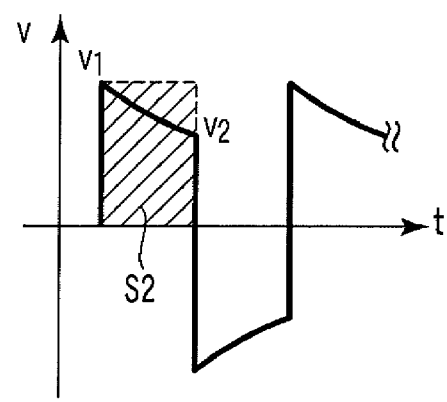
FIG. 9B is a graph showing areas to be calculated in the graphs depicted in FIG. 8 when obtaining a voltage holding ratio of the liquid crystal layer.

At this time, the voltage holding ratio in the liquid crystal layer 4B is obtained as a ratio of an area S1 of a trapezoid surrounded by the abscissa (a time axis) and a potential change graph (potentials V1 and V2) in the liquid crystal layer 4B (see FIG. 9A) and an area S2 of a rectangle surrounded by a graph of the liquid crystal layer 4B obtained if the potential of the liquid crystal layer 4B is not reduced from V1 and the abscissa (the time axis) (see FIG. 9B) (see the graph in the hold mode). That is, the voltage holding ratio in the liquid crystal layer 4B is determined as S1/S2.

As explained above, according to this first embodiment, there can be provided the physical property measuring method for a TFT liquid crystal panel that enables accurately measuring various physical properties of a desired region (pixel) in the liquid crystal layer of the TFT liquid crystal panel that can be used as an actual product by the electrical technique.

Specifically, the various physical properties of the liquid crystal layer 4B of the TFT liquid crystal panel 4 cannot be measured by the electrical technique till Vg of the gate electrode 41A of the TFT 4A is maintained at the predetermined potential, which is one of main characteristics of the present invention.

It is to be noted that the present invention is not restricted to the foregoing embodiment, and it can be of course modified and applied in many ways within the scope of the present invention.

Modification

Figure 10:
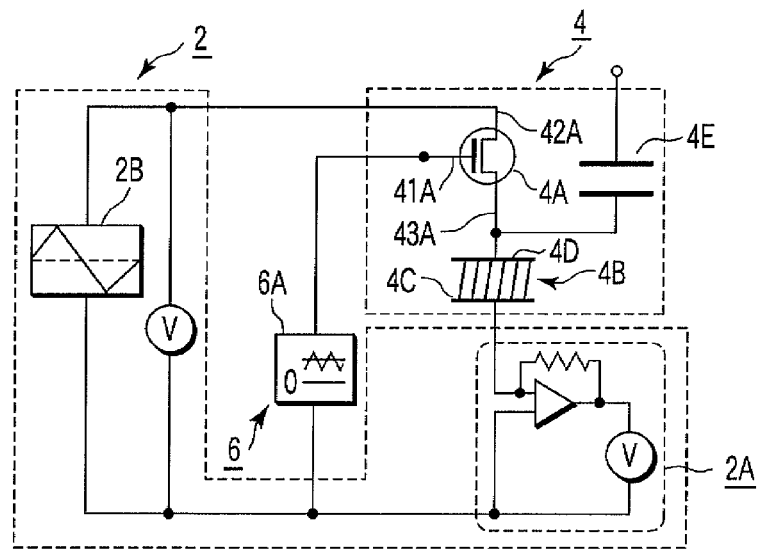
FIG. 10 is a view showing a modification of the circuit depicted in FIG. 1B.

For example, the equivalent circuit having the apparatus configuration that realizes the physical property measuring method of the TFT liquid crystal panel according to the first embodiment described in conjunction with FIG. 1B can be substituted by a circuit having such a configuration as depicted in FIG. 10. A difference between the circuit shown in FIG. 1B and the circuit depicted in FIG. 10 will now be described.

First, in the first embodiment, the side maintained at ground potential by virtual grounding in the measuring apparatus 2 (which will be referred to as a GND side hereinafter) is connected with the source electrode 42A of the TFT 4A.

On the other hand, in this modification, the GND side of the measuring device 2 is connected with the opposed electrode 4C of the liquid crystal layer 4B through the current measuring unit 2A as shown in FIG. 10.

Additionally, in the first embodiment, the opposed electrode 4C of the liquid crystal layer 4B of the TFT liquid crystal panel 4 is connected with a side where a potential fluctuates due to a voltage applied by the triangular wave generator 2B in the measuring device 2 (which will be referred to as a potential fluctuation side hereinafter).

On the other hand, in this embodiment, the source electrode 42A of the TFT 4A is connected with the potential fluctuation side in the measuring device 2 as shown in FIG. 10.

Further, in this modification, a triangular wave generator is used as the constant voltage source 6A that is used to apply a constant voltage to the gate electrode 41A of the TFT 4A.

It is to be noted that the triangular wave generator utilized as the constant voltage source 6A outputs a triangular wave that is offset to output a voltage higher than the voltage applied to the source electrode 42A of the TFT 4A by a predetermined value. As a result, one of the main characteristics of the present invention, i.e., maintaining Vg of the gate electrode 41A of the TFT 4A at the predetermined potential is enabled.

It is to be noted that the embodiment and the modification are not restricted to a TN type liquid crystal and they can be of course applied to liquid crystal panels adopting various structures based on various modes, e.g., an IPS (In-Plane Switching) mode.

Further, in actual measurement, it is good enough to reduce an impedance between a source and a drain of the TFT 4A to prevent the I-V curve (see FIG. 3 and FIG. 4B) from becoming obtuse.

Here, when measuring the various physical properties, whether an impedance between the source and the drain of the TFT 4 takes a sufficiently small value can be confirmed by performing measurement of, e.g., an ion density in the liquid crystal layer 4B while gradually increasing potential Vg of the gate electrode 41A from, e.g., V (in a general amorphous TFT or an n-channel TFT, an impedance is reduced when a value of the potential Vg of the gate electrode 41A is increased) to check that the V-I curve is not obtuse.

Furthermore, the various physical properties can be measured by using the value of the potential Vg of the gate electrode 41A obtained from the measurement when the V-I curve is not obtuse. For example, in the embodiment, the value of the potential Vg of the gate electrode 41A is maintained at 10V to effect measurement. Moreover, when a value of the potential Vg of the gate electrode 41A is set to 0 V, the V-I curve becomes obtuse, which is inappropriate for measurement.

Since a value of the potential Vg of the gate electrode 41A and a value of the impedance between the source and the drain differ depending on each liquid crystal panel product, 10 V is not necessarily appropriate as a value of the potential Vg of the gate electrode 41A, and 0 V is not of course necessarily inappropriate as a value of the potential Vg of the gate electrode 41A.

It is to be noted that the respective physical properties are individually measured when measuring the physical properties of the liquid crystal layer 4B and the auxiliary capacitor 4E in the embodiment and the modification. However, the physical properties of the liquid crystal layer 4B and the physical properties of the auxiliary capacitor 4E may be of course simultaneously measured. The measuring circuit in this case is as shown in, e.g., FIG. 11.

Figure 11:
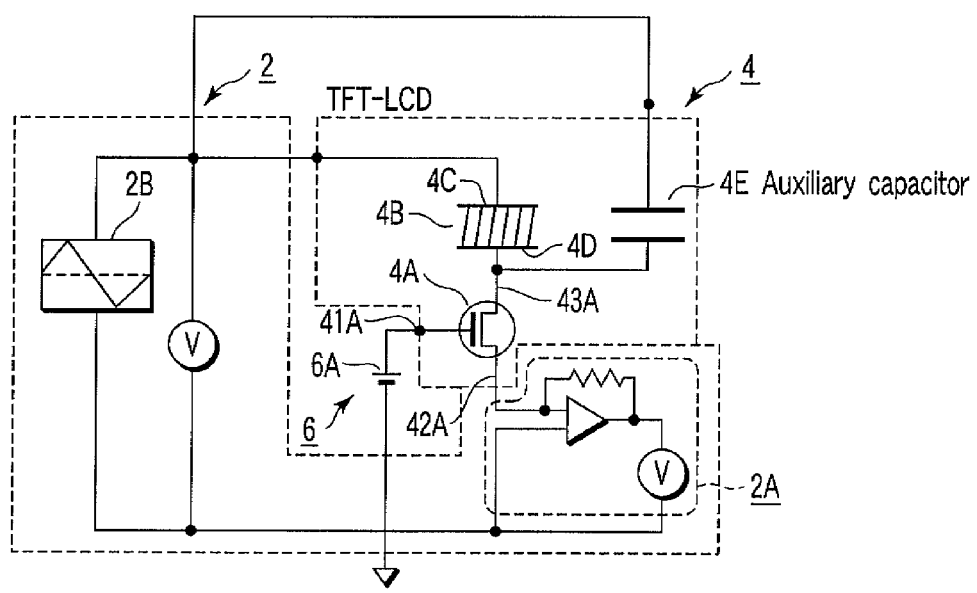
FIG. 11 is a view showing a measuring circuit utilized to simultaneously measure physical properties of the liquid crystal layer and physical properties of the auxiliary capacitor.

Here, a difference between a measuring circuit shown in FIG. 11 that simultaneously measures the physical properties of the liquid crystal layer 4B and the physical properties of the auxiliary capacitor 4E and the measuring circuit shown in FIG. 1B lies in that the liquid crystal layer 4B and the auxiliary capacitor 4E are connected in parallel to the triangular wave generator 2B in the measuring circuit shown in FIG. 11.

When this measuring circuit shown in FIG. 11 is used to perform measurement based on the same measuring method as the measuring method described in conjunction with the foregoing embodiment, physical properties in which characteristics of the liquid crystal layer 4B are combined with characteristics of the auxiliary capacitor 4E can be obtained. That is, for example, it is possible to obtain V-I characteristics that a value of the width 23 indicative of the capacitance of the liquid crystal layer 4B depicted in FIG. 3 is increased by an amount corresponding to the capacitance of the auxiliary capacitor 4E. Further, the various physical properties can be obtained from the V-I characteristics as explained above.

In other words, in the measuring circuit depicted in FIG. 11, when the measuring method described in conjunction with the first embodiment is applied, a combined current of a transient current flowing through the liquid crystal layer 4B to which the triangular wave voltage is applied and a transient current flowing through the auxiliary capacitor 4E can be measured to obtain physical properties in which characteristics of the liquid crystal layer 4B are combined with characteristics of the auxiliary capacitor 4E.

Figure 12:
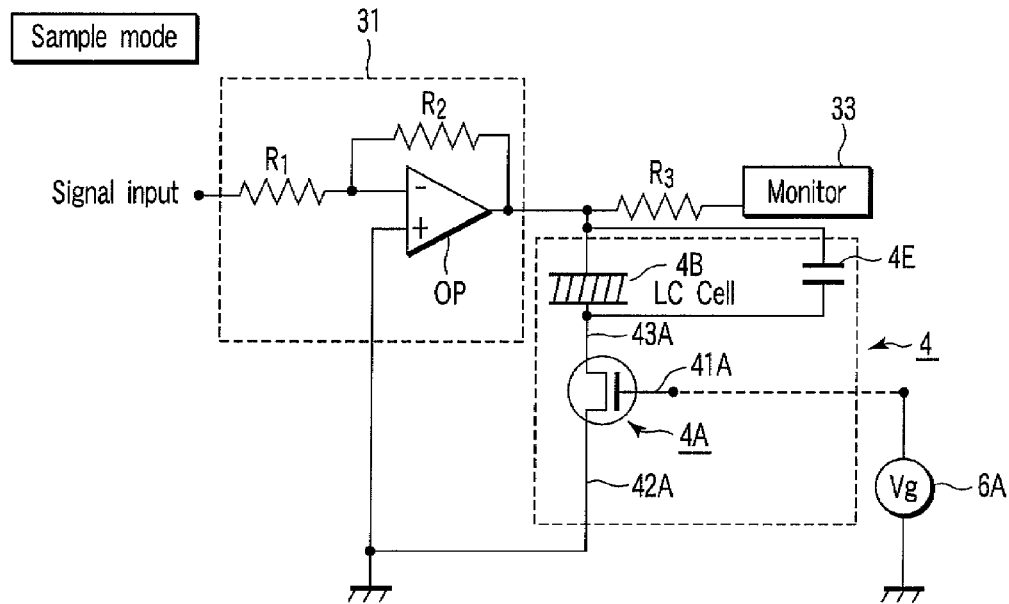
FIG. 12 is a view showing a circuit utilized to write a pulse voltage in the liquid crystal layer and the auxiliary capacitor at the same time.
Figure 13:
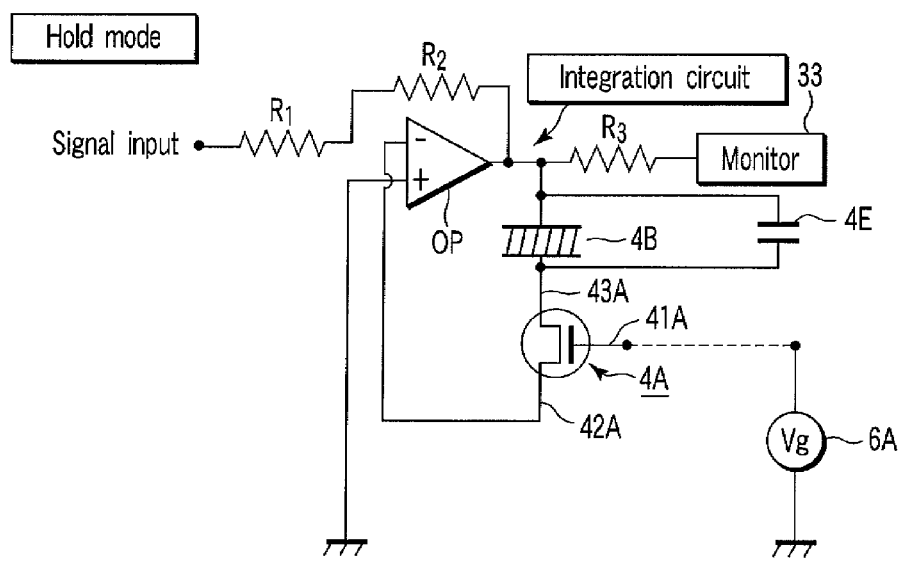
FIG. 13 is a view showing a circuit utilized to detect a change in combined potential of the liquid crystal layer and the auxiliary capacitor.

Further, in circuits depicted in FIGS. 12 and 13, when the voltage holding ratio measuring method is applied, a combined voltage holding ratio in the liquid crystal layer 4B and the auxiliary capacitor 4E electrically connected with the liquid crystal layer 4B in parallel can be measured.

Here, FIG. 12 is a view showing the circuit that is used to write a pulse voltage in the liquid crystal layer 4B and the auxiliary capacitor 4E at the same time. Furthermore, FIG. 13 is a view showing the circuit that is used to detect a change in combined potential in the liquid crystal layer 4B and the auxiliary capacitor 4E.

It is to be noted that a different between the circuits depicted in FIGS. 12 and 13 and the circuits shown in FIGS. 6A and 6B is whether the auxiliary capacitor 4E is electrically connected with the liquid crystal layer 4B in parallel.

Second Embodiment

A second embodiment according to the present invention will now be described hereinafter with reference to the drawings.

In the first embodiment, the measurement fundamental principle of the physical property measuring method for a TFT liquid crystal panel has been mainly explained. In this second embodiment, a more specific measuring method will now be described in detail.

FIG. 14A is a view showing a structural example of an apparatus that realizes a physical property measuring method for a TFT liquid crystal panel according to this second embodiment. FIG. 15 is a view showing a flowchart of the physical property measuring method for a TFT liquid crystal panel according to this second embodiment.

The physical property measuring method for a TFT liquid crystal panel according to the second embodiment will now be described hereinafter with reference to FIGS. 14A and 15. It is to be noted that an explanation overlapping the first embodiment will be omitted.

As shown in FIG. 14A, the physical property measuring method for a TFT liquid crystal panel according to the second embodiment is realized by a measuring device 200. That is, the measuring device 200 measures various physical properties of a desired region in a TFT liquid crystal panel 400.

The measuring device 200 includes current measuring units 200A1 to 200An each including an I/V amplifier, a triangular wave generator 200B, a gate potential holding unit 260 that is used to maintain a potential Vg of later-explained gate lines G1 to Gm at a predetermined potential (VgH or VgL), and changeover SWs 260A1 to 260Am that change over the potential Vg of the gate lines G1 to Gm.

As shown in the drawing, the TFT liquid crystal panel 400 has gate lines G1 to Gm, data lines S1 to Sn, TFTs 400A11 to 400Amn, liquid crystal layers 400B11 to 400Bmn, opposed electrodes 400C11 to 400Cmn, and pixel electrodes 400D11 to 400Dmn. That is, in the example shown in the drawing, the TFT liquid crystal panel 400 has m×n pixels.

In detail, as shown in the drawing, for example, the gate line G1 and the data line S1 are connected with the TFT 400A11, and the gate line Gm and the data line Sn are likewise connected with the TFT 400Amn.

In the second embodiment, the measuring device 200 having the above-described structure measures physical properties of a desired one of the liquid crystal layers 400B11 to 400Bmn of the TFT liquid crystal panel 400. It is to be noted that a region formed of the liquid crystal layers where physical properties are measured (which will be referred to as a measurement target region hereinafter) is a region formed of the liquid crystal layers 400B11, 400B12, 400B13, 400B21, 400B22, 400B23, 400B31, 400B32, and 400B33 for convenience of explanation.

First, the current measuring units 200A1 to 200A3 which are current measuring units respectively associated with the respective data lines are connected with the data lines S1 to S3 associated with the measurement target region (step S11). Further, the triangular wave generator 200B is connected with an opposed electrode (which is represented as individual opposed electrodes 400C11 to 400Cmn in FIG. 14A for convenience) common to all pixels.

Furthermore, the changeover SWs 260A1 to 260A3 are turned on to maintain the potential Vg of the gate lines G1 to G3 associated with the measurement target region at VgH (step S12). Here, the potential VgH is a potential that can set an impedance of each TFT (each of the TFTs 400A11 to 400A33 in this example; each TFT in the measurement target region will be generically referred to as a TFT 400A hereinafter) to a small value that enables measuring a current flowing through a liquid crystal layer 400B (each of the liquid crystal layers 400B11 to 400B33 in this example; each liquid crystal layer in the measurement target region will be generically referred to as the liquid crystal layer 400B). It should be noted that sources 420A11 to 420A33 of the TFT 400A in the measurement target region will be generically referred to as a source 420A, and drains 430A11 to 430A33 of the TFT 400A in the measurement target region will be generically referred to as a drain 430A.

When represented by using such abbreviations, VgH is a potential that can set an impedance between the source electrode 420A and drain electrode 430A of the TFT 400A as the TFT in the measurement target region to a value that enables a current to flow between the source 420A and drain 430A of the TFT 400A (a detailed numerical value is as explained in the first embodiment).

That is, in the second embodiment, a gate line associated with the measurement target region is maintained at the predetermined potential, and a data line associated with the measurement target region is connected with the current measuring unit. Furthermore, the triangular wave generator 200B is connected with the opposed electrode common to all pixels. Moreover, various physical properties are measured by using the measuring method described in the first embodiment. As a result, the various physical properties of the liquid crystal layers in the measurement target region alone can be accurately measured.

It is to be noted that the potential Vg of the gate electrode 410A is maintained at the potential VgH, but the potential Vg of the gate electrode 410A does not have to be necessarily maintained at a fixed value as long as it is a potential that can set the impedance of the TFT 400A to a value that enables a current to flow between the source 420A and drain 430A of the TFT.

That is, the potential Vg of the gate electrode 410A may be one that varies with time as long as it can set the impedance of the TFT 400A to a value that enables a current to flow between the source 420A and the drain 430A of the TFT.

Meanwhile, after the processing in step S12, a triangular wave signal generated by the triangular wave generator 200B is applied to the opposed electrode 400C of the TFT liquid crystal panel 400, and a voltage that cyclically varies is applied to the liquid crystal layer 400B (step S13). It is to be noted that the opposed electrodes 400C11 to 400C33 in the measurement target region will be generically referred to as an opposed electrode 400C.

After the processing in step S13, a transient current flowing through the liquid crystal layer 400B is measured (step S14) to measure various physical properties of the liquid crystal layer 400B (step S15). A graph of a voltage V (time t)-current I plot obtained by measuring the transient current in step S14 and a relationship between the graph and various physical properties are as described in the first embodiment.

It is to be noted that potentials of the data lines and the gate lines associated with a region other than the measurement target region (which will be referred to as a measurement non-target region hereinafter) are set as follow in detail.

That is, one or more data lines associated with the measurement non-target region may be partially or entirely grounded (maintained at ground potential), or may be maintained at any other potential without being grounded (maintained at ground potential). That is, the potential of each data line associated with the measurement non-target region may be maintained at any potential as long as it is maintained at a potential that does not obstruct the measurement in the measurement target region.

On the other hand, one or more gate lines associated with the measurement non-target region may be partially or entirely maintained at VgL, or may be maintained at any other potential. That is, it is good enough to maintain the potential of each gate line associated with the measurement non-target region (each of the gate lines G4, G5, . . . , and Gm in the example shown in FIG. 14) at a value that can set a current flowing through each of the current measuring units 200A1, 200A2, and 200A3 via each liquid crystal layer that is present in the measurement non-target region and connected with the source line associated with the measurement target region (each of the liquid crystal layers 400B41, 400B42, 400B43, 400B51, 400B52, 400B53, . . . , 400Bm1, 400Bm2, and 400Bm3) to a value sufficiently smaller than the current flowing through the measurement target region.

It is to be noted that whether the potential of each gate line associated with the measurement non-target region is the sufficiently small value can be judged based on a measurement waveform (see FIG. 3) in the measurement target region while gradually reducing VgL.

For example, when the potential of each gate line associated with the measurement non-target region is not sufficiently small, a current from the measurement non-target region is reflected in the measurement waveform. A measurement current in this case is calculated as being larger than in the case where the current from the measurement non-target region has no influence. Therefore, the capacitance of the liquid crystal layer calculated from the measurement waveform in this case is calculated as being larger than the actual capacitance. Moreover, in such a case, a distortion or the like is of course produced in such a measurement waveform as shown in FIG. 3.

Various regions will be assumed as the measurement target regions, and the method of measuring various physical properties of the TFT liquid crystal panel 400 will now be described with reference to FIGS. 14B to 14D. It is to be noted that a description will be given as to a difference from the measuring apparatus and the measuring method explained with reference to FIG. 14A alone in order to avoid a tautological explanation.

FIG. 14B is a view showing a structural example of a physical property measuring apparatus when the measurement target region is an entire surface of the TFT liquid crystal panel 400. As shown in the drawing, a measuring device 200 includes a current measuring unit 200A1 including an I/V amplifier, a triangular wave generator 200B, a gate potential holding unit 260 that is used to hold a potential Vg of gate lines G1 to Gm at a predetermined potential (VgH or VgL), and a changeover SW 260A1 that is used to switch the potential Vg of the gate lines G1 to Gm.

Although particulars will be described later, all the gate lines (the gate lines G1 to Gm) are connected with the gate potential holding unit 260 through the changeover SW 260A1. On the other hand, all data lines (data lines S1 to Sn) are connected with the current measuring unit 200A1. Further, triangular wave generator 200B is connected with an opposed electrode (which is represented as individual opposed electrodes 400C11 to 400Cmn in FIG. 14B for convenience) common to all pixels.

The physical property measuring method for a TFT liquid crystal panel according to the second embodiment will now be described hereinafter with reference to a flowchart depicted in FIG. 15.

First, the current measuring unit 200A1 is connected with the data lines S1 to Sn associated with the measurement target region (step S11). Furthermore, the triangular wave generator 200B is connected with the opposed electrode (which is represented as the individual opposed electrodes 400C11 to 400Cmn in FIG. 14B for convenience) common to all pixels.

Moreover, the changeover SW 260A1 is turned on to maintain the potential Vg of the gate lines G1 to Gm associated with the measurement target region at the potential VgH (step S12). Here, the potential VgH is a potential that can set an impedance of each TFT (each of the TFTs 400A11 to 400Amn in this example; each TFT in the measurement target region will be generically referred to as the TFT 400A hereinafter) to a small value that enables measuring a current flowing through a liquid crystal layer 400B (each of the liquid crystal layers 400B11 to 400Bmn in this example; each liquid crystal layer in the measurement target region will be generically referred to as the liquid crystal layer 400B hereinafter).

It should be noted that the sources 420A11 to 420Amn of the TFT 400A in the measurement target region are generically referred to as the source 420A, and the drains 430A11 to 430Amn of the TFT 400A in the measurement target region are generically referred to as the drain 430A.

When represented by using such abbreviations, VgH is a potential that can set the impedance between the source 420A and the drain electrode 430A of the TFT 400A as the TFT in the measurement target region to a value that enables a current to flow between the source 420A and drain 430A of the TFT 400A (a detailed numerical value is as described in the first embodiment).

Meanwhile, after the processing in step S12, a triangular wave signal generated by the triangular wave generator 200B is applied to the opposed electrode 400C of the TFT liquid crystal panel 400, and a voltage that cyclically varies is applied to the liquid crystal layer 400B (step S13). It is to be noted that the opposed electrodes 400C11 to 400Cmn in the measurement target region are generically called the opposed electrode 400C.

After the processing in step S13, a transient current flowing through the liquid crystal layer 400B is measured (step S14), and various physical properties of the liquid crystal layer 400B are measured (step S15). A graph of a voltage V (time t)-current I plot obtained by measuring the transient current in step S14 and a relationship between the graph and the various physical properties are as described in the first embodiment.

Figure 14C:
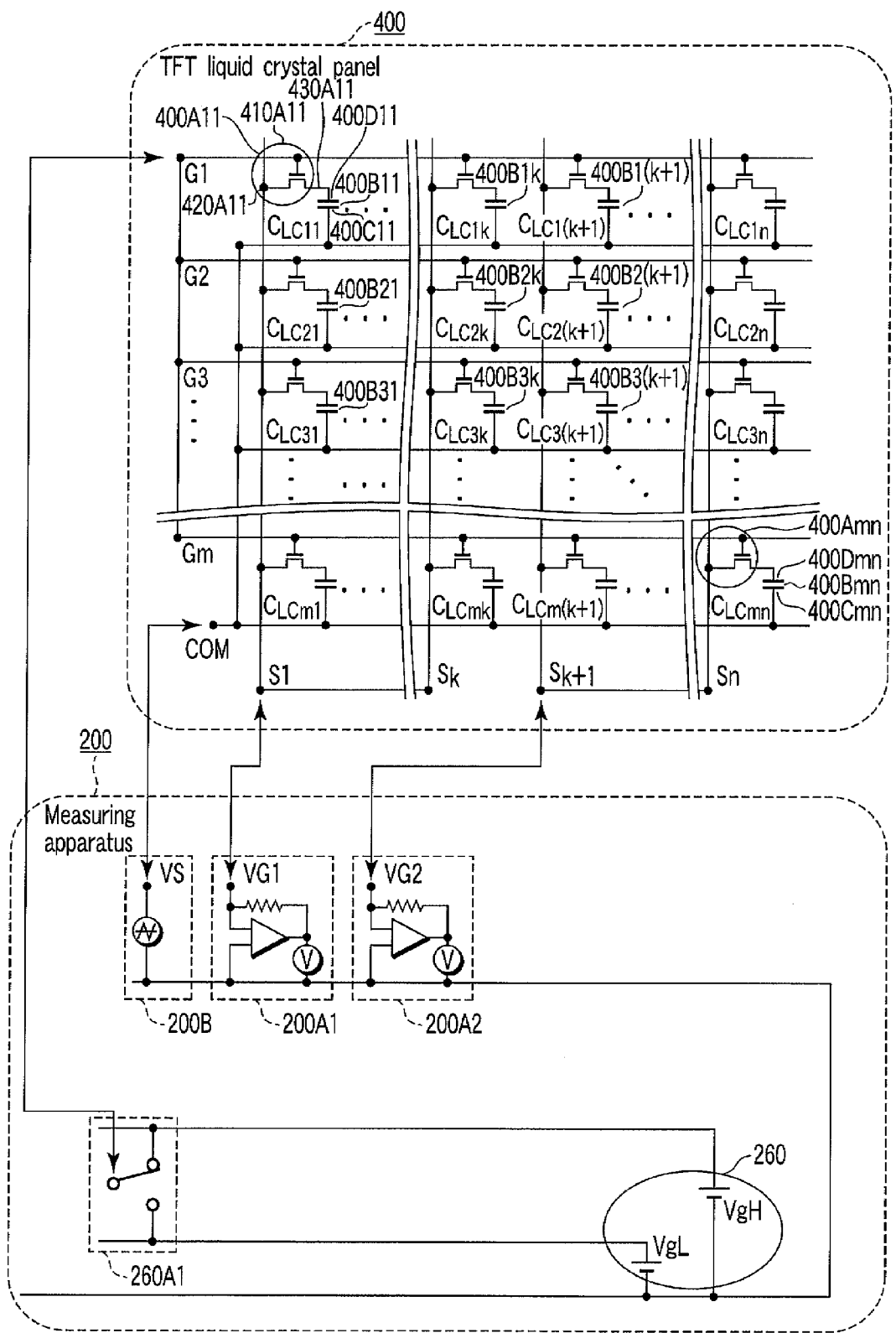
FIG. 14C is a view showing an example of the apparatus structure that realizes the physical property measuring method for a TFT liquid crystal panel according to the second embodiment.

FIG. 14C is a view showing a structural example of a physical property measuring apparatus when one of two divided regions (a region associated with the data lines S1 to Sk or a region associated with the data lines Sk+1 to Sn) obtained by dividing the TFT liquid crystal panel 400 into two in a lateral direction is the measurement target region. As shown in the drawing, a measuring device 200 includes current measuring units 200A1 and 200A2 each including an I/V amplifier, a triangular wave generator 200B, a gate potential holding unit 260 that maintains a potential Vg of gate lines G1 to Gm at a predetermined potential (VgH or VgL), and a changeover SW 260A1 that is used to switch the potential Vg of the gate lines G1 to Gm.

Although particulars will be explained later, all the gate lines (the gate lines G1 to Gm) are connected with the gate potential holding unit 260 through the changeover SW 260A1. On the other hand, all the data lines (the data lines S1 to Sk) are connected with the current measuring unit 200A1, and the data lines (the data lines Sk+1 to Sn) are connected with the current measuring unit 200A2.

Further, the triangular wave generator 200B is connected with an opposed electrode (which is represented as individual opposed electrodes 400C11 to 400Cmn in FIG. 14B) common to all pixels for convenience.

A physical property measuring method of a TFT liquid crystal panel according to the second embodiment will now be described with reference to FIG. 15. Here, a region including the TFT connected with the data lines S1 to Sk is determined as a measurement target region.

First, the data lines S1 to Sk associated with the measurement target region are connected with the current measuring unit 200A1 (step S11). Further, the triangular wave generator 200B is connected with the opposed electrode (which is represented as the individual opposed electrodes 400C11 to 400Cmn in FIG. 14C for convenience) common to all pixels.

Furthermore, the changeover SW 260A1 is turned on to maintain the potential Vg of the gate lines G1 to Gm associated with the measurement target region at the potential VgH (step S12). Here, VgH is a potential that can set an impedance of each TFT (each TFT in the measurement target region is generically called the TFT 400A in this example) in the measurement target region to a small value that enables measuring a current flowing through the liquid crystal layer 400B (each liquid crystal layer in the measurement target region is generically called the liquid crystal layer 400B).

It should be noted that each source of the TFT 400A in the measurement target region is generically called the source 420A, and each drain of the TFT 400A in the measurement target region is generically called the drain 430A.

When represented by using such abbreviations, VgH is a potential that can set the impedance between the source electrode 420A and drain electrode 430A of the TFT 400A as the TFT in the measurement target region to a value that enables a current to flow between the source 420A and the drain 430A of the TFT 400A (a detailed numerical value is as described in the first embodiment).

Meanwhile, after the processing in step S12, a triangular wave signal generated by the triangular wave generator 200B is applied to the opposed electrode 400C of the TFT liquid crystal panel 400, and a voltage that cyclically varies is applied to the liquid crystal layer 400B (step S13). It should be noted that each opposed electrode in the measurement target region is generically called the opposed electrode 400C.

After the processing in step S13, the transient current flowing through the liquid crystal layer 400B is measured (step S14), and various physical properties of the liquid crystal layer 400B are measured (step S15). A graph of a voltage V (time t)-current I obtained by measuring the transient current in step S14 and the relationship between the graph and the various physical properties are as described in the first embodiment.

It should be noted that the various physical properties obtained from a measurement result supplied from the current measuring unit 200A1 are various physical properties of the liquid crystal layer 400B (each of the liquid crystal layers 400B11 to 400Bmk in this example) associated with the TFT 400A connected with the data lines S1 to Sk. Likewise, the various physical properties obtained from a measurement result supplied from the current measuring unit 200A2 are various physical properties of the liquid crystal layer 400B (each of the liquid crystal layers 400B1(k+1) to 400Bmn in this example) associated with the TFT 400A connected with the data lines Sk+1 to Sn.

FIG. 14D is a view showing a structural example of a physical property measuring apparatus when one of two divided regions obtained by vertically dividing the TFT liquid crystal panel 400 into two (a region associated with gate lines G1 to Gk or a region associated with gate lines Gk+1 to Gn) is a measurement target region. As shown in the drawing, a measuring device 200 includes a current measuring unit 200A1 including an I/V amplifier, a triangular wave generator 200B, a gate potential holding unit 260 that maintains a potential Vg of the gate lines G1 to Gm at a predetermined potential (VgH or VgL), a changeover SW 260A1 that is used to switch the potential Vg of the gate lines G1 to Gk, and a changeover SW 260A2 that is used to switch the potential Vg of the gate lines Gk+1 to Gm.

Although particulars will be described later, the gate lines G1 to Gk are connected with the gate potential holding unit 260 through the changeover SW 260A1, and the gate lines Gk+1 to Gm are connected with the gate potential holding unit 260 through the changeover SW 260A2. On the other hand, data lines (data lines S1 to Sn) are connected with the current measuring unit 200A1.

Furthermore, the triangular wave generator 200B is connected with the opposed electrode (which is represented as individual opposed electrodes 400C11 to 400Cmn in FIG. 14B for convenience) common to all pixels.

A physical property measuring method of a TFT liquid crystal panel according to the second embodiment will now be described with reference to a flowchart depicted in FIG. 15. Here, a region including the TFT connected with the gate lines G1 to Gk is determined as a measurement target region.

First, the data lines S1 to Sn are connected with the current measuring unit 200A1 (step S11). Moreover, the triangular wave generator 200B is connected with the opposed electrode (which is represented as the individual opposed electrodes 400C11 to 400Cmn in FIG. 14D for convenience) common to all pixels.

Additionally, the changeover SW 260A1 is turned on to maintain the potential Vg of the gate lines G1 to Gk associated with the measurement target region at the potential VgH (step S12). Here, VgH is a potential that can set an impedance of each TFT (each TFT in the measurement target region is generically called the TFT 400A in this example) in the measurement target region to a small value that enables measuring a current flowing through the liquid crystal layer 400B (each liquid crystal layer in the measurement target region is generically called the liquid crystal layer 400B in this example).

It is to be noted that the changeover SW 260A2 is turned off to maintain the potential Vg of the gate lines Gk+1 to Gm at the potential VgL.

Meanwhile, each source of the TFT 400A in the measurement target region is generically called the source 420A, and each drain of the TFT 400A in the measurement target region is generically called the drain 430A.

When represented by using such abbreviations, VgH is a potential that can set the impedance between the source electrode 420A and drain electrode 430A of the TFT 400A as the TFT in the measurement target region to a value that enables a current to flow between the source 420A and drain 430A of the TFT 400A (a detailed numerical value is as described in the first embodiment).

Meanwhile, after the processing in step S12, a triangular wave signal generated by the triangular wave generator 200B is applied to the opposed electrode 400C of the TFT liquid crystal panel 400, and a voltage that cyclically varies is applied to the liquid crystal layer 400B (step S13). It should be noted that each opposed electrode in the measurement target region is generically called the opposed electrode 400C.

After the processing in step S13, a transient current flowing through the liquid crystal layer 400B is measured (step S14), and various physical properties of the liquid crystal layer 400B are measured (step S15). A graph of a voltage V (time t)-current I plot obtained by measuring the transient current in step S14 and a relationship between the graph and the various physical properties are as described in the first embodiment.

It is to be noted that, when the changeover SWs 260A1 and 260A2 are switched to maintain the potential of the gate lines G1 to Gk at VgH and maintain the potential of the gate lines Gk+1 to Gm at VgL, various physical properties obtained from a measurement result supplied from the current measuring unit 200A1 are various physical properties of the liquid crystal layer 400B (each of the liquid crystal layers 400B11 to 400Bkn in this example) associated with the TFT 400A connected with the gate lines G1 to Gk. Likewise, when the changeover SWs 260A1 and 260A2 are switched to maintain the potential of the gate lines Gk+1 to Gm at VgH and maintain the potential of the gate lines G1 to Gk at VgL, various physical properties obtained from a measurement result supplied from the current measuring unit 200A1 are various physical properties of the liquid crystal layer 400B (each of the liquid crystal layers 400B(k+1)1 to 400$mn$) associated with the TFT 400A connected with the gate lines Gk+1 to Gm.

A method of obtaining a voltage holding ratio of the liquid crystal layer in the second embodiment will now be described with reference to FIGS. 16A and 16B.

Figure 17:
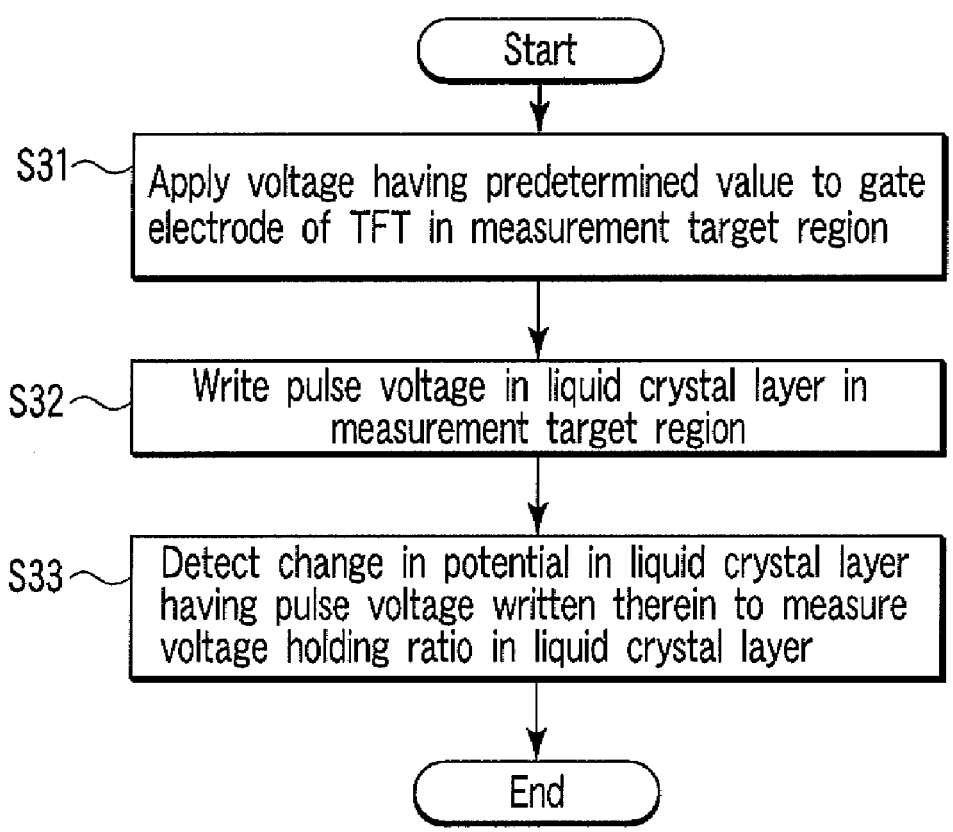
FIG. 17 is a view showing a flowchart of a voltage holding ratio measuring method for the liquid crystal layer in the second embodiment.

Here, FIG. 16A shows a circuit that is used to write a pulse voltage in the liquid crystal layer 400B, and FIG. 16B shows a circuit that is used to detect a change in potential in the liquid crystal layer 400B. FIG. 17 is a view showing a flowchart of the method of obtaining a voltage holding ratio in the liquid crystal layer 400B.

To enable detection of a change in potential in the liquid crystal layer 400B by the monitor 330, Vg of the gate electrode 410A of the TFT 400A is constantly maintained at a predetermined potential by a constant voltage source 60A as shown in FIGS. 16A and 16B (step S31).

In the circuit that is used to write a pulse voltage in the liquid crystal layer 400B, a voltage application unit 310 formed of a resistor R1, a resistor R2, and an operational amplifier OP is connected with the TFT liquid crystal panel 400 having the TFT 400A and the liquid crystal layer 400B. That is, the voltage application unit 310 writes a pulse voltage in the liquid crystal layer 400B (step S32).

Meanwhile, the voltage application unit 310 is connected with a voltage source (not shown) that generates the pulse voltage. That is, the voltage source (not shown) supplies a voltage signal to the voltage application unit 310.

Further, the voltage application unit 310 and the TFT liquid crystal panel 400 are connected with the monitor 330 that is used to detect a change in potential in the liquid crystal layer 400B through the resistor R3. Furthermore, the source 420A of the TFT 400A is grounded.

Under the above-described circuit configuration, as shown in FIG. 16A, a pulse voltage determined by the ratio of resistance R1 to resistance R2 in the voltage application unit 310 is applied to the liquid crystal layer 400B by the voltage source (not shown), thereby writing the pulse voltage to the liquid crystal layer 400B (step S32).

Subsequently, the structure is switched to a counterpart depicted in FIG. 16B to input an output from the source 420A of the TFT 400A to the operational amplifier OP. In other words, an output from the source electrode 420A is negatively fed back to the operational amplifier OP.

It is to be noted that the source 420A alone of the TFT 400A associated with the liquid crystal layer 400B in the measurement target region at this time is input to the operational amplifier OP, and the source of the TFT associated with the liquid crystal layer outside the measurement target region is grounded.

Here, in view of the structure where the liquid crystal layer 400B has a resistance component and a capacitance component, a portion formed of resistor R1, resistor R2, the liquid crystal layer 400B, and the operational amplifier OP can be regarded as one type of integrator.

That is, according to the circuit depicted in FIG. 16B, when the resistance component or the capacitance component in the liquid crystal layer 400B is changed, this change appears as a change in output voltage of the operational amplifier OP. Therefore, when this change is detected by the monitor 330 and the measuring method described in the first embodiment is used, a voltage holding ratio of the liquid crystal layer 400B is measured (step S33).

As explained above, according to the second embodiment, there can be provided the physical property measuring method for a TFT liquid crystal panel that enables accurately measuring various physical properties of a desired region (pixel) in the liquid crystal layer of the TFT liquid crystal panel that can be utilized as an actual product by using the electrical technique.

Specifically, measurement of the various physical properties of the liquid crystal layer 4B of the TFT liquid crystal panel 4 based on the electrical technique cannot be carried out till the potential Vg of the gate electrode 41A of the TFT 4A is maintained at the predetermined potential, which is one of the main characteristics of the present invention.

Although the present invention has been described based on the first embodiment and the second embodiment, the present invention is not restricted to the foregoing embodiments, and various modifications and applications can be of course carried out within the scope of the present invention.

For example, "the method for simultaneously measuring physical properties of the liquid crystal layer and physical properties of the auxiliary capacitor" described as the modification of the first embodiment with reference to FIG. 11 can be of course applied to the second embodiment.

Likewise, "the method for measuring a combined voltage holding ratio of the liquid crystal layer and the auxiliary capacitor electrically connected with the liquid crystal layer in parallel in measurement of the voltage holding ratio" described as the modification of the first embodiment with reference to FIGS. 12 and 13 can be of course applied to the second embodiment.

It is to be noted that, in relation to the second embodiment, the number of the current measuring units 200A1 to 200An is not restricted to n which is equal to the number of columns of pixels, and providing at least one current measuring unit can suffice. For example, when the single current measuring unit alone is provided, the current measuring unit can be sequentially connected with the data lines S1 to Sn in order to measure the measurement target region formed of a plurality of columns.

However, when the number of the current measuring units is increased, a time concerning the measurement can be of course reduced.

Moreover, the foregoing embodiments include inventions on various stages, and various invention can be extracted based on appropriate combinations of a plurality of disclosed constituent elements. For example, when the problems described in the section "problems to be solved by the invention" can be solved and the effects described in the section "effect of the invention" can be obtained even though several constituent elements are eliminated from all constituent elements disclosed in the foregoing embodiments, a structure from which these constituent elements are eliminated can be extracted as an invention.

What is claimed is:

1. A physical property measuring method for a TFT liquid crystal panel, comprising:
   an impedance setting step of setting the impedance between the source and drain of a TFT of the TFT liquid crystal panel to be less than or equal to a predetermined value;
   a voltage application step of applying a voltage that cyclically varies to a liquid crystal layer of the TFT liquid crystal panel and an auxiliary capacitor that is electrically connected with the liquid crystal layer in parallel; and
   a physical property measuring step of measuring a combined current of a transient current flowing through the liquid crystal layer and a transient current flowing through the auxiliary capacitor to which the voltage that cyclically varies is applied in the voltage application step to measure physical properties as a combination of characteristics of the liquid crystal layer and characteristics of the auxiliary capacitor.

2. The method according to claim 1, wherein, in the impedance setting step, the impedance between the source and drain of the TFT is set to a value which enables a current to flow between the source and drain of the TFT by applying a predetermined voltage to the gate electrode of the TFT.

3. The method according to claim 2, wherein liquid crystal molecules in the liquid crystal layer are driven by an electric field formed by a pixel electrode driven by the TFT and a common electrode provided in association with the pixel electrode, and
   a triangular wave voltage is applied as the voltage that cyclically varies to the common electrode in the voltage application step.

4. The method according to claim 3, wherein the predetermined voltage is higher than that applied to the source electrode and drain electrode of the TFT.

5. The method according to claim 4, wherein, in the voltage application step, a potential of the source electrode of the TFT is maintained at ground potential.

6. The method according to claim 5, wherein, in the voltage application step, the potential of the source electrode of the TFT is maintained at ground potential by virtual grounding.

7. The method according to claim 1, wherein the physical properties of the TFT liquid crystal panel correspond to at least one of the combined resistance of the liquid crystal layer and the auxiliary capacitor, the combined capacitance of the liquid crystal layer and the auxiliary capacitor, the switching voltage of the liquid crystal layer, the ion density of the liquid crystal layer, and the ion mobility of the liquid crystal layer.

* * * * *